(12) United States Patent
Watanabe et al.

(10) Patent No.: US 9,745,406 B2
(45) Date of Patent: Aug. 29, 2017

(54) CURABLE COMPOSITION

(75) Inventors: Yutaka Watanabe, Tokyo (JP); Atsushi Saito, Tokyo (JP)

(73) Assignee: CEMEDINE CO., LTD., Tokyo (JP)

( * ) Notice: Subject to any disclaimer, the term of this patent is extended or adjusted under 35 U.S.C. 154(b) by 851 days.

(21) Appl. No.: 13/232,447

(22) Filed: Sep. 14, 2011

(65) Prior Publication Data
US 2012/0004371 A1 Jan. 5, 2012

Related U.S. Application Data

(63) Continuation of application No. PCT/JP2010/054320, filed on Mar. 15, 2010.

(30) Foreign Application Priority Data

Mar. 23, 2009 (JP) ................. 2009-070623

(51) Int. Cl.
| | |
|---|---|
| C08G 18/48 | (2006.01) |
| C08G 18/10 | (2006.01) |
| C08G 18/75 | (2006.01) |
| C08G 18/76 | (2006.01) |
| C08L 33/04 | (2006.01) |
| C08L 43/04 | (2006.01) |
| C08L 75/08 | (2006.01) |
| C09J 143/04 | (2006.01) |
| C08L 33/14 | (2006.01) |
| C08L 75/04 | (2006.01) |
| C08F 220/14 | (2006.01) |
| C08F 220/18 | (2006.01) |

(52) U.S. Cl.
CPC ......... *C08G 18/4825* (2013.01); *C08G 18/10* (2013.01); *C08G 18/755* (2013.01); *C08G 18/7621* (2013.01); *C08L 33/04* (2013.01); *C08L 33/14* (2013.01); *C08L 43/04* (2013.01); *C08L 75/08* (2013.01); *C09J 143/04* (2013.01); *C08F 220/14* (2013.01); *C08F 2220/1891* (2013.01); *C08L 75/04* (2013.01)

(58) Field of Classification Search
CPC ................................................. C08G 18/289
USPC ................. 525/128, 126, 454, 455
See application file for complete search history.

(56) References Cited

U.S. PATENT DOCUMENTS

| | | | | |
|---|---|---|---|---|
| 5,109,064 A | * | 4/1992 | Wakabayashi et al. | 525/100 |
| 7,153,923 B2 | * | 12/2006 | Schindler et al. | 528/35 |
| 7,960,459 B2 | * | 6/2011 | Noro et al. | 524/195 |
| 7,977,445 B2 | * | 7/2011 | Hattemer et al. | 528/28 |
| 2007/0203297 A1 | * | 8/2007 | Wakabayashi et al. | 525/187 |
| 2008/0125539 A1 | * | 5/2008 | Mack | 524/588 |
| 2008/0221245 A1 | | 9/2008 | Huang et al. | |

FOREIGN PATENT DOCUMENTS

| | | |
|---|---|---|
| DE | 10 2004 055450 A1 | 5/2006 |
| EP | 0 265 929 A2 | 5/1988 |
| JP | 46-27250 B | 8/1971 |
| JP | 63-112642 A | 5/1988 |
| JP | 11-124509 A | 5/1999 |
| JP | 2000169545 A * | 6/2000 |
| JP | 2001-40037 A | 2/2001 |
| JP | 2003-313397 A | 11/2003 |
| JP | 2005-501146 A | 1/2005 |
| JP | 2005-248175 A | 9/2005 |
| JP | 2007-230947 A | 9/2007 |
| JP | 2008-163141 A | 7/2008 |
| WO | 97/18247 A1 | 5/1997 |

OTHER PUBLICATIONS

Machine Translation of JP 2000169545 A.*
Extended European Search Report of Dec. 1, 2015.

\* cited by examiner

*Primary Examiner* — Mike M Dollinger
(74) *Attorney, Agent, or Firm* — McGlew and Tuttle, P.C.

(57) ABSTRACT

Provided is a curable composition which realizes compatibility between curability and toughness, shows rapid curability and excellent storage stability, and does not require any tin catalyst. The curable composition comprises: (A) a vinyl-based resin obtained by causing a compound (I) represented by the following general formula (1) and a compound (II) represented by the following general formula (2) to react with each other; (B) a urethane-based resin obtained by causing a hydroxyl group-containing organic polymer, a polyisocyanate compound, a compound (III) represented by the following general formula (3), and an amine compound to react with one another; and (C) a curing catalyst.

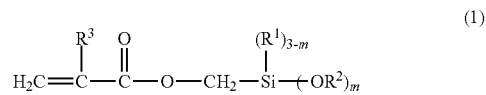

(1)

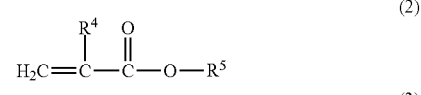

(2)

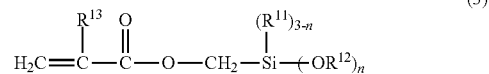

(3)

13 Claims, No Drawings

CURABLE COMPOSITION

CROSS REFERENCE TO RELATED APPLICATIONS

This application is a continuation of International Application No. PCT/JP2010/054320 filed on Mar. 15, 2010 which designates the United States, and claims priority to Japanese Patent Application No. 2009-070623 filed on Mar. 23, 2009, the entire contents of which are incorporated herein by reference.

TECHNICAL FIELD

The present invention relates to a curable composition, in particular, a curable composition containing a vinyl-based resin having a reactive silyl group and a urethane-based resin having a reactive silyl group.

BACKGROUND ART

An organic polymer and a curable composition each having an alkoxysilyl group having reactivity have already been industrially produced and merchandised, and have been widely used in applications such as an adhesive, a sealing material, and a paint. A method involving polymerizing a compound having a polymerizable unsaturated bond and an alkoxysilyl group, and a vinyl-based monomer has been conventionally known as a method of synthesizing an organic polymer having an alkoxysilyl group, and a (meth) acryloxypropylpolyalkoxysilane such as methacryloxypropyltrimethoxysilane has been used as the compound having a polymerizable unsaturated bond and an alkoxysilyl group (Patent Document 1).

Such curable composition is typically cured with any of various metal catalysts, and has been used for assorted applications depending on the kinds of the catalysts and whether the addition amounts thereof are large or small. However, such conventional curable composition has had difficulty in achieving compatibility between curability and toughness. Further, the metal catalysts generally used in those applications, which are organotin compounds, may each contain a highly toxic tributyltin derivative, and hence a concern has been raised about the toxicity.

Meanwhile, as described in Patent Document 2, there exists a polymer having an alkoxysilane terminal having such high reactivity that the content of a tin-containing catalyst can be significantly reduced. Among the contents reported in the literature is, for example, a report that a catalyst containing tin and any other heavy metal can be removed. However, the polymer having an alkoxysilane terminal described in Patent Document 2 is problematic in terms of its storage stability, though the polymer is excellent in curability. Accordingly, a problem arises upon production of an industrial product from the polymer.

PRIOR ART DOCUMENTS

Patent Documents

[Patent Document 1] JP 63-112642 A
[Patent Document 2] JP 2005-501146 W

DISCLOSURE OF THE INVENTION

Problem to be Solved by the Invention

An object of the present invention is to provide a curable composition which realizes compatibility between curability and toughness, shows rapid curability and excellent storage stability, and does not require any tin catalyst.

Means for Solving the Problem

The inventors of the present invention have made extensive studies on high reactivity and excellent storage stability in a curable composition containing a reactive silyl group-containing organic polymer. Thus, the inventors have completed the present invention.

A curable composition of the present invention comprises: (A) a vinyl-based resin obtained by causing a compound (I) represented by the following general formula (1) and a compound (II) represented by the following general formula (2) to react with each other; (B) a urethane-based resin obtained by causing a hydroxyl group-containing organic polymer, a polyisocyanate compound, a compound (III) represented by the following general formula (3), and an amine compound to react with one another; and (C) a curing catalyst.

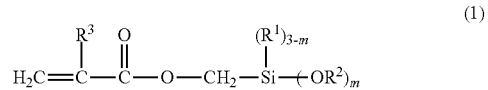
(1)

In the general formula (1), $R^1$ represents an alkyl group having 1 to 18 carbon atoms, an alkenyl group, an aryl group, or a phenyl group, $R^2$ represents an alkyl group having 1 to 4 carbon atoms, an alkenyl group, an aryl group, or a phenyl group, $R^3$ represents hydrogen or a methyl group, and m represents an integer of 1 to 3.

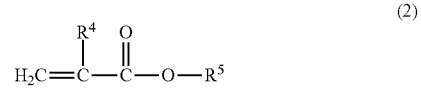
(2)

In the general formula (2), $R^4$ represents a hydrogen atom, a halogen atom, or an alkyl group having 1 to 3 carbon atoms, and $R^5$ represents a hydrogen atom, an alkali metal atom, or a hydrocarbon-containing group having 1 to 24 carbon atoms.

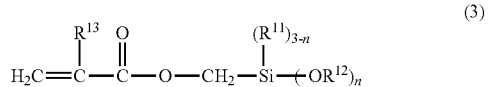
(3)

In the general formula (3), $R^{11}$ represents an alkyl group having 1 to 18 carbon atoms, an alkenyl group, an aryl group, or a phenyl group, $R^{12}$ represents an alkyl group having 1 to 4 carbon atoms, an alkenyl group, an aryl group, or a phenyl group, $R^{13}$ represents hydrogen or a methyl group, and n represents an integer of 1 to 3.

The curing catalyst (C) suitably comprises an amine compound.

The vinyl-based resin (A) suitably comprises a structural unit represented by the following general formula (4) and a structural unit represented by the following general formula (5).

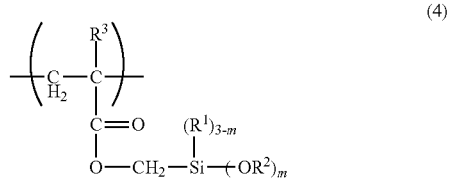

(4)

In the general formula (4), $R^1$ represents an alkyl group having 1 to 18 carbon atoms, an alkenyl group, an aryl group, or a phenyl group, $R^2$ represents an alkyl group having 1 to 4 carbon atoms, an alkenyl group, an aryl group, or a phenyl group, $R^3$ represents hydrogen or a methyl group, and m represents an integer of 1 to 3.

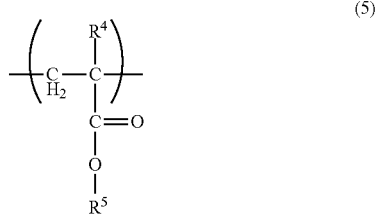

(5)

In the general formula (5), $R^4$ represents a hydrogen atom, a halogen atom, or an alkyl group having 1 to 3 carbon atoms, and $R^5$ represents a hydrogen atom, an alkali metal atom, or a hydrocarbon-containing group having 1 to 24 carbon atoms.

The reaction for the vinyl-based resin (A) preferably comprises radical polymerization. In addition, the radical polymerization suitably comprises free radical polymerization or living radical polymerization.

Two or more kinds of compounds in each of which $R^5$ in the general formula (2) represents an alkyl group having 1 to 24 carbon atoms are preferably used as the compound (II). When two or more kinds of the compound (II) are used, the compound (II) suitably comprises a compound in which $R^5$ in the general formula (2) represents an alkyl group having 1 to 8 carbon atoms, and a compound in which $R^5$ in the general formula (2) represents an alkyl group having 10 to 24 carbon atoms. In addition, the compound (II) suitably comprises a compound in which $R^5$ in the general formula (2) represents an alkyl group having 1 or 2 carbon atoms, and a compound in which $R^5$ in the general formula (2) represents an alkyl group having 7 to 9 carbon atoms.

The hydroxyl group-containing organic polymer preferably comprises a hydroxyl group-containing oxyalkylene-based polymer.

The urethane-based resin (B) is suitably produced by a method comprising the step of causing a prepolymer obtained by causing the hydroxyl group-containing organic polymer and the polyisocyanate compound to react with each other, and a reaction product X obtained by causing the compound (III) and the amine compound to react with each other to react with each other.

In addition, the urethane-based resin (B) is preferably produced by a method comprising the steps of: (a) causing a reaction product X obtained by causing the compound (III) and the amine compound to react with each other, and the polyisocyanate compound to react with each other to provide a reaction product Y; and (b) causing the reaction product Y obtained in the step (A) and the hydroxyl group-containing organic polymer to react with each other.

In the curable composition of the present invention, the urethane-based resin (B) and the curing catalyst (C) are preferably blended in amounts of 1 to 10,000 parts by mass and 0.000001 to 10 parts by mass, respectively with respect to 100 parts by mass of the vinyl-based resin (A).

The curable composition of the present invention is suitably used in an adhesive.

An adhesive composition of the present invention comprises the curable composition of the present invention.

Advantageous Effects of Invention

The curable composition of the present invention exerts the following marked effects. The composition realizes compatibility between curability and toughness, does not require any tin catalyst, and is excellent in rapid curability, storage stability, and adhesiveness. The curable composition of the present invention can be used in, for example, an adhesive, a sealing material, a tackiness material, a coating material, a potting material, a paint, a putty material, or a primer, and can be particularly suitably used in an adhesive.

DESCRIPTION OF EMBODIMENTS

Hereinafter, embodiments of the present invention are described. Needless to say, however, those embodiments are exemplarily shown, and various modifications can be made thereto as long as the modifications do not deviate from the technical idea of the present invention.

A curable composition of the present invention comprises: (A) a vinyl-based resin obtained by causing a compound (I) represented by the following general formula (1) and a compound (II) represented by the following general formula (2) to react with each other; (B) a urethane-based resin obtained by causing a hydroxyl group-containing organic polymer, a polyisocyanate compound, a compound (III) represented by the following general formula (3), and an amine compound to react with one another; and (C) a curing catalyst.

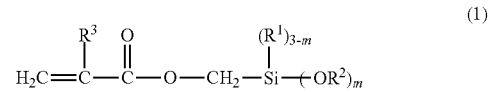

(1)

In the general formula (1), $R^1$ represents an alkyl group having 1 to 18 carbon atoms, an alkenyl group, an aryl group, or a phenyl group, $R^2$ represents an alkyl group having 1 to 4 carbon atoms, an alkenyl group, an aryl group, or a phenyl group, $R^3$ represents hydrogen or a methyl group, and m represents an integer of 1 to 3.

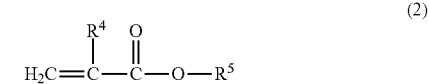

(2)

In the general formula (2), $R^4$ represents a hydrogen atom, a halogen atom, or an alkyl group having 1 to 3 carbon atoms, and $R^5$ represents a hydrogen atom, an alkali metal atom, or a hydrocarbon-containing group having 1 to 24 carbon atoms.

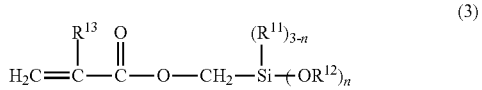

(3)

In the general formula (3), $R^{11}$ represents an alkyl group having 1 to 18 carbon atoms, an alkenyl group, an aryl group, or a phenyl group, $R^{12}$ represents an alkyl group having 1 to 4 carbon atoms, an alkenyl group, an aryl group, or a phenyl group, $R^{13}$ represents hydrogen or a methyl group, and n represents an integer of 1 to 3.

The vinyl-based resin (A) used in the present invention is a vinyl-based resin obtained by causing the compound (I) represented by the general formula (1) and the compound (II) represented by the general formula (2) to react with each other.

In the compound (I), $R^1$ in the general formula (1) represents an alkyl group having 1 to 18 carbon atoms, an alkenyl group, an aryl group, or a phenyl group, preferably an alkyl group having 1 to 18 carbon atoms, an aryl group having 6 to 20 carbon atoms, or an aralkyl group having 7 to 20 carbon atoms, most preferably a methyl group. When a plurality of $R^1$s exist, the $R^1$s may be identical to or different from each other. $R^2$ represents an alkyl group having 1 to 4 carbon atoms, an alkenyl group, an aryl group, or a phenyl group, preferably a methyl group. When a plurality of $R^2$s exist, the $R^2$s may be identical to or different from each other. $R^3$ represents hydrogen or a methyl group. m represents 1, 2, or 3, more preferably 3 in terms of rapid curability.

Specific examples of the compound (I) comprise acryloxymethyltrimethoxysilane, acryloxymethylmethyldimethoxysilane, acryloxymethyldimethylmethoxysilane, acryloxymethyltriethoxysilane, acryloxymethylmethyldiethoxysilane, acryloxymethyldimethylethoxysilane, acryloxymethyltripropoxysilane, acryloxymethylmethyldipropoxysilane, acryloxymethyldimethylpropoxysilane, acryloxymethylphenyldimethoxysilane, acryloxymethyldiphenylmethoxysilane, acryloxymethylphenyldiethoxysilane, acryloxymethyldiphenylethoxysilane, acryloxymethylphenyldipropoxysilane, acryloxymethyldiphenylpropoxysilane, methacryloxymethyltrimethoxysilane, methacryloxymethylmethyldimethoxysilane, methacryloxymethyldimethylmethoxysilane, methacryloxymethyltriethoxysilane, methacryloxymethylmethyldiethoxysilane, methacryloxymethyldimethylethoxysilane, methacryloxymethyltripropoxysilane, methacryloxymethylmethyldipropoxysilane, methacryloxymethyldimethylpropoxysilane, methacryloxymethylphenyldimethoxysilane, methacryloxymethyldiphenylmethoxysilane, methacryloxymethylphenyldiethoxysilane, methacryloxymethyldiphenylethoxysilane, methacryloxymethylphenyldipropoxysilane, and methacryloxymethyldiphenylpropoxysilane. In particular, acryloxymethyltrimethoxysilane, acryloxymethylmethyldimethoxysilane, acryloxymethyldimethylmethoxysilane, acryloxymethyltriethoxysilane, acryloxymethylmethyldiethoxysilane, acryloxymethyldimethylethoxysilane, methacryloxymethyltrimethoxysilane, methacryloxymethylmethyldimethoxysilane, methacryloxymethyldimethylmethoxysilane, methacryloxymethyltriethoxysilane, methacryloxymethylmethyldiethoxysilane, and methacryloxymethyldimethylethoxysilane are preferred. One kind of those compounds may be used alone, or two or more kinds thereof may be used in combination.

In the compound (II), $R^4$ in the general formula (2) represents a hydrogen atom, a halogen atom, or an alkyl group having 1 to 3 carbon atoms, preferably a hydrogen atom or a methyl group. $R^5$ represents a hydrogen atom, an alkali metal atom, or a hydrocarbon-containing group having 1 to 24 carbon atoms. The hydrocarbon-containing group may be linear, or may have a side chain. In addition, at least part of the hydrogen atoms in the hydrocarbon-containing group or in a group that forms a side chain of the hydrocarbon-containing group may be substituted with at least one kind of a polar group or reactive functional group selected from the group consisting of a chlorine atom, a fluorine atom, a primary amino group, a secondary amino group, a tertiary amino group, quaternary amine salt groups, an amide group, an isocyanate group, an alkylene oxide group, a hydroxysilyl group, a methoxysilyl group, an ethoxysilyl group, a propoxysilyl group, a chlorosilyl group, a bromosilyl group, and a glycidyl group, and the hydrocarbon-containing group may have a double bond. Further, the hydrocarbon-containing group may have a cyclic structure. Examples of $R^5$ comprises an alkyl group having 1 to 24 carbon atoms, a cycloalkyl group, an aryl group, an alkenyl group, a cycloalkenyl group, an alkoxy group, and an alkyl ether group. At least part of the hydrogen atoms that construct the group $R^5$ may each be substituted with a halogen atom, a sulfonic acid group, a glycidyl group, or the like.

Examples of the compound (II) comprise: acrylic acid and salts thereof such as an alkali metal salt of acrylic acid; methacrylic acid and salts thereof such as an alkali metal salt of methacrylic acid; acrylic acid alkyl esters such as methyl acrylate, ethyl acrylate, propyl acrylate, butyl acrylate, pentyl acrylate, hexyl acrylate, 2-ethylhexyl acrylate, octyl acrylate, nonyl acrylate, decyl acrylate, and dodecyl acrylate; acrylic acid aryl esters such as phenyl acrylate and benzyl acrylate; alkoxyalkyl acrylates such as methoxyethyl acrylate, ethoxyethyl acrylate, propoxyethyl acrylate, butoxyethyl acrylate, and ethoxypropyl acrylate; methacrylic acid alkyl esters such as methyl methacrylate, ethyl methacrylate, propyl methacrylate, butyl methacrylate, pentyl methacrylate, hexyl methacrylate, 2-ethylhexyl methacrylate, octyl methacrylate, nonyl methacrylate, decyl methacrylate, and dodecyl methacrylate; methacrylic acid aryl esters such as phenyl methacrylate and benzyl methacrylate; alkoxyalkyl methacrylates such as methoxyethyl methacrylate, ethoxyethyl methacrylate, propoxyethyl methacrylate, butoxyethyl methacrylate, and ethoxypropyl methacrylate; diacrylic acid esters of (poly)alkylene glycols, such as diacrylic acid ester of ethylene glycol, diacrylic acid ester of diethylene glycol, diacrylic acid ester of triethylene glycol, diacrylic acid ester of polyethylene glycol, diacrylic acid ester of propylene glycol, diacrylic acid ester of dipropylene glycol, and diacrylic acid ester of tripropylene glycol; dimethacrylic acid esters of (poly)alkylene glycols, such as dimethacrylic acid ester of ethylene glycol, dimethacrylic acid ester of diethylene glycol, dimethacrylic acid ester of triethylene glycol, diacrylic acid ester of polyethylene glycol, dimethacrylic acid ester of propylene glycol, dimethacrylic acid ester of dipropylene glycol, and dimethacrylic acid ester of tripropylene glycol; polyvalent acrylic acid esters such as trimethylolpropane triacrylic acid ester; polyvalent methacrylic acid esters such as trimethylolpropane trimethacrylic acid ester; acrylonitrile; methacrylonitrile; vinyl acetate; vinylidene chloride; halogenated vinyl compounds such as 2-chloroethyl acrylate and 2-chloroethyl methacrylate; acrylic acid esters of alicyclic alcohols, such as cyclohexyl acrylate; methacrylic acid esters of alicyclic alcohols, such as cyclohexyl methacrylate; oxazoline group-containing polymerizable compounds such as 2-vinyl-2-oxazoline, 2-vinyl-5-methyl-2-oxazoline, and 2-isopropenyl-2-oxazoline; aziridine group-containing polymerizable compounds such as acryloylaziridine, methacryloylaziridine, 2-aziridinylethyl acrylate, and 2-aziridinylethyl methacrylate; epoxy group-containing vinyl monomers such as allyl glycidyl ether, acrylate glycidyl ether, methacrylate glycidyl ether, acrylate glycidyl ether, acrylate 2-ethylglycidyl ether, and methacrylate 2-ethylglycidyl ether; hydroxyl group-containing vinyl compounds such as 2-hydroxyethyl acrylate, 2-hydroxyethyl methacrylate, 2-hydroxypropyl acrylate, monoester of acrylic acid or methacrylic acid with polypropylene glycol or polyethylene glycol, and adducts of lactones with 2-hydroxyethyl (meth) acrylate; fluorine-containing vinyl monomers such as a fluorine substituted methacrylic acid alkyl ester and a fluorine substituted acrylic acid alkyl ester; unsatutated carboxylic acids except (meth)acrylic acid, such as itaconic acid, crotonic acid, maleic acid, and fumaric acid, salts thereof, (partial) ester compounds thereof, and acid anhydrides thereof; reactive halogen-containing vinyl monomers such as 2-chloroethyl vinyl ether and vinyl monochloroacetate; amide group-containing vinyl monomers such as methacrylamide, N-methylolmethacrylamide, N-methoxyethylmethacrylamide, N-butoxy-methylmethacrylamide, N,N'-dimethylacrylamide, N,N'-dimethylaminopropylacrylamide, N,N'-dimethylaminoethylacrylate, acryloylmorpholine, N-isopropylacrylamide, and N,N'-diethylacrylamide; and diene compounds such as ethylidene norbornene, isoprene, pentadiene, vinylcyclohexene, chloroprene, butadiene, methylbutadiene, cyclobutadiene, and methylbutadiene, and styrene-based monomers such as styrene, vinyl toluene, α-methyl styrene, β-methyl styrene, o-methyl styrene, m-methyl styrene, p-methyl styrene, 1-butyl styrene, and chloro styrene. One kind of those compounds may be used alone, or two or more kinds thereof may be used in combination.

In the present invention, two or more kinds of compounds in each of which $R^5$ in the general formula (2) represents an alkyl group having 1 to 24 carbon atoms are each preferably used as the compound (II). When the two or more kinds of compounds in each of which $R^5$ in the general formula (2) represents an alkyl group having 1 to 24 carbon atoms are used, a combination of the compounds is not limited, but two or more kinds of compounds different from each other in number of carbon atoms of $R^5$ are preferably selected.

One or more kinds of compounds in each of which $R^5$ in the general formula (2) represents an alkyl group having 1 to 8 carbon atoms, and one or more kinds of compounds in each of which $R^5$ in the general formula (2) represents a long-chain alkyl group having 10 to 24 carbon atoms are suitably used in combination as the two or more kinds of compounds different from each other in number of carbon atoms of $R^5$.

Examples of the alkyl group having 1 to 8 carbon atoms comprise alkyl groups each having 1 to 8, preferably 1 to 4, more preferably 1 or 2 carbon atoms, such as a methyl group, an ethyl group, a propyl group, an n-butyl group, a t-butyl group, and a 2-ethylhexyl group. One kind of the compounds in each of which $R^5$ represents an alkyl group having 1 to 8 carbon atoms may be used alone, or two or more kinds thereof may be used in combination. When two or more kinds thereof are used in combination, $R^5$s may be identical to or different from each other.

Examples of the long-chain alkyl group having 10 to 24 carbon atoms comprise alkyl groups each having 10 to 24, preferably 10 to 20 carbon atoms, such as a lauryl group, a tridecyl group, a hexadecyl group, an octadecyl group, and a behenyl group. One kind of the compounds in each of which $R^5$ represents an alkyl group having 10 to 24 carbon atoms may be used alone, or two or more kinds thereof may be used in combination. When two or more kinds thereof are used in combination, compounds having different $R^5$s may be used in combination.

In addition, one or more kinds of compounds in each of which $R^5$ in the general formula (2) represents an alkyl group having 1 or 2 carbon atoms, i.e., a methyl group or an ethyl group, and one or more kinds of compounds in each of which $R^5$ in the general formula (2) represents an alkyl group having 7 to 9 carbon atoms, i.e., a heptyl group, an octyl group, or a nonyl group are suitably used in combination as the two or more kinds of compounds different from each other in number of carbon atoms of $R^5$. One kind of the compounds in each of which $R^5$ represents an alkyl group having 1 or 2 carbon atoms may be used alone, or two or more kinds thereof may be used in combination. When two or more kinds thereof are used in combination, $R^5$s may be identical to or different from each other. One kind of the compounds in each of which $R^5$ represents an alkyl group having 7 to 9 carbon atoms may be used alone, or two or more kinds thereof may be used in combination. When two or more kinds thereof are used in combination, $R^5$s may be identical to or different from each other.

In the present invention, a known polymerization method (such as a synthesis method described in, for example, JP 63-112642 A, JP 2007-230947 A, JP 2001-40037 A, or JP 2003-313397 A) can be employed as a method of causing the compound (I) represented by the general formula (1) and the compound (II) represented by the general formula (2) to react with each other, and a radical polymerization method involving using a radical polymerization reaction is preferred. Examples of the radical polymerization method comprise a radical polymerization method involving copolymerizing predetermined monomer units with a polymerization initiator (free radical polymerization method) and a controlled radical polymerization method by which a reactive silyl group can be introduced to a controlled position such as a terminal. Of those, the controlled radical polymerization method is suitable. Examples of the controlled radical polymerization method comprise a free radical polymerization method and a living radical polymerization method each involving using a chain transfer agent having a specific functional group. Of those, a living radical polymerization method such as a reversible addition-fragmentation chain transfer (RAFT) polymerization method or a radical polymerization method involving using a transition metal complex (transition-metal-mediated living radical polymerization) is more preferred. A reaction involving using a thiol compound having a reactive silyl group, or a reaction involving using a thiol compound having a reactive silyl group and a metallocene compound (JP 2001-40037 A) is also suitable.

<Free Radical Polymerization Method>

When the free radical polymerization method is employed, a reaction is preferably performed with a chain transfer agent and an initiator at 0° C. to 200° C. In particular, the polymerization reaction temperature is more preferably set to fall within the range of 25° C. to 150° C. When the polymerization reaction temperature is set to fall within the above-mentioned range, the reaction can be stably advanced without being caused to run away. Even when an acrylic acid ester-based, polymerizable unsaturated compound having relatively high polymerizability is used, a reaction temperature of less than 0° C. results in poor efficiency because of the following reason, though the threshold temperature varies depending on the activity of an unsaturated group of the polymerizable unsaturated compound to be used. The activity reduces, and hence a time period required to achieve a sufficient rate of polymerization lengthens. Further, even when a compound having low polymerization activity such as a styrene-type unsaturated compound is used, a sufficient rate of polymerization can be achieved as long as a condition of 25° C. or more is satisfied. When the free radical polymerization method is employed, a reaction time can be appropriately set in consideration of a rate of polymerization, a molecular weight, and the like. The reaction time is set to fall within the range of typically 1 to 144 hours, preferably 2 to 8 hours under, for example, such condition as described above.

A wide range of known chain transfer agents can each be used as the chain transfer agent without any particular limitation. Of those, a thiol compound is preferred, and a thiol compound having a reactive silyl group is more preferred. Examples thereof comprise mercaptomethyltrimethoxysilane, mercaptomethylmethyldimethoxysilane, mercaptomethyldimethylmethoxysilane, mercaptomethyltriethoxysilane, mercaptomethylmethyldiethoxysilane, mercaptomethyldimethylethoxysilane, mercaptomethyltripropoxysilane, mercaptomethylmethyldipropoxysilane, mercaptomethyldimethylpropoxysilane, 3-mercaptopropyltrimethoxysilane, 3-mercaptopropyl-triethoxysilane, 3-mercaptopropyl-monomethyldimethoxysilane, 3-mercaptopropyl-monophenyldimethoxysilane, 3-mercaptopropyl-dimethylmonomethoxysilane, 3-mercaptopropyl-monomethyldiethoxysilane, 4-mercaptobutyl-trimethoxysilane, and 3-mercaptobutyl-trimethoxysilane. One kind of those compounds may be used alone, or two or more kinds thereof may be used in combination.

The chain transfer agent can be used in an ordinary amount, though the amount can be appropriately set in consideration of a molecular weight, a molecular weight distribution, and the like. Specifically, the chain transfer agent is used in an amount of typically 0.001 to 30 parts by mole, preferably 0.01 to 20 parts by mole with respect to 100 parts by mole of the polymerizable unsaturated compound to be polymerized.

Examples of the initiator comprise, but not particularly limited to, an azo-based initiator, a peroxide-based initiator, an ionic initiator, and a redox initiator. One kind of those initiators may be used alone, or two or more kinds thereof may be used in combination.

Examples of the azo-based initiator comprise azonitrile compounds such as 2,2'-azobis(4-methoxy-2,4-dimethylvaleronitrile) (V-70, manufactured by Wako Pure Chemical Industries, Ltd.), 2,2'-azobis(2,4-dimethylvaleronitrile) (V-65, manufactured by Wako Pure Chemical Industries, Ltd.), 2,2'-azobisisobutyronitrile (V-60, manufactured by Wako Pure Chemical Industries, Ltd.), 2,2'-azobis(2-methylbutyronitrile) (V-59, manufactured by Wako Pure Chemical Industries, Ltd.), 1,1'-azobis(cyclohexane-1-carbonitrile) (V-40, manufactured by Wako Pure Chemical Industries, Ltd.), 1-[(1-cyano-1-methylethyl) azo] formamide (V-30, manufactured by Wako Pure Chemical Industries, Ltd.), and 2-phenylazo-4-methoxy-2,4-dimethylvaleronitrile (V-19, manufactured by Wako Pure Chemical Industries, Ltd.), azoamide compounds such as 2,2'-azobis[2-methyl-N-[1,1-bis(hydroxymethyl)-2-hydroxyethyl] propionamide] (VA-080, manufactured by Wako Pure Chemical Industries, Ltd.), 2,2'-azobis[2-methyl-N-[1,1-bis(hydroxymethyl) ethyl]-propionamide] (VA-082, manufactured by Wako Pure Chemical Industries, Ltd.), 2,2'-azobis[2-methyl-N-[2-(1-hydroxybutyl)]-propionamide] (VA-085, manufactured by Wako Pure Chemical Industries, Ltd.), 2,2'-azobis[2-methyl-N-(2-hydroxyethyl)-propionamide] (VA-086, manufactured by Wako Pure Chemical Industries, Ltd.), 2,2'-azobis(2-methylpropionamide) dihydrate (VA-088, manufactured by Wako Pure Chemical Industries, Ltd.), 2,2'-azobis[N-(2-propenyl)-2-methylpropionamide] (VF-096, manufactured by Wako Pure Chemical Industries, Ltd.), 2,2'-azobis(N-butyl-2-methylpropionamide) (VAm-110, manufactured by Wako Pure Chemical Industries, Ltd.), and 2,2'-azobis(N-cyclo-hexyl-2-methylpropionamide) (VAm-111, manufactured by Wako Pure Chemical Industries, Ltd.), and alkyl azo compounds such as 2,2'-azobis(2,4,4-trimethylpentane) (VR-110, manufactured by Wako Pure Chemical Industries, Ltd.) and 2,2'-azobis(2-methylpropane) (VR-160, manufactured by Wako Pure Chemical Industries, Ltd.).

Examples of the peroxide-based initiator comprise ketone peroxides such as methyl ethyl ketone peroxide (PERMEK H, manufactured by NOF CORPORATION), cyclohexanone peroxide (PERHEXA H, manufactured by NOF CORPORATION), methylcyclohexanone peroxide (PERHEXA Q, manufactured by NOF CORPORATION), methyl acetoacetate peroxide (PERCURE SA, manufactured by NOF CORPORATION), and acetyl acetone peroxide (PERCURE A, manufactured by NOF CORPORATION), peroxyketals such as 1,1-bis(t-hexylperoxy)-3,3,5-trimethylcyclohexane (PERHEXA TMH, manufactured by NOF CORPORATION), 1,1-bis(t-hexylperoxy) cyclohexane (PERHEXA HC, manufactured by NOF CORPORATION), 1,1-bis(t-butylperoxy)-3,3,5-trimethylcyc lohexane (PERHEXA 3M, manufactured by NOF CORPORATION), 1,1-bis(t-butylperoxy)cyclohexane (PERHEXA C, manufactured by NOF CORPORATION), 1,1-bis(t-butylperoxy) cyclododecane (PERHEXA CD-R, manufactured by NOF CORPORATION), 2,2'-bis(t-butylperoxy) butane (PERHEXA 22, manufactured by NOF CORPORATION), n-butyl 4,4-bis(t-butylperoxy) valerate (PERHEXA V, manufactured by NOF CORPORATION), and 2,2-bis(4,4-di-t-butylperoxycyclohexyl) propane (PERTETRA A, manufactured by NOF CORPORATION), hydroperoxides such as t-butyl hydroperoxide (PERBUTYL H-69, manufactured by NOF CORPORATION), p-menthane hydroperoxide (PERMENTHA H, manufactured by NOF CORPORATION), diisopropylbenzene hydroperoxide (PERCUMYL P, manufactured by NOF CORPORATION), 1,1,3,3-tetramethylbutyl hydroperoxide (PEROCTA H, manufactured by NOF CORPORATION), cumene hydroperoxide (PERCUMYL H-80, manufactured by NOF CORPORATION), and t-hexyl hydroperoxide (PERHEXYL H, manufactured by NOF CORPORATION), dialkyl peroxides such as 2,5-dimethyl-2,5-bis(t-butylperoxy) hexyne-3 (PERHEXYNE 25B, manufactured by NOF CORPORATION), di-t-butyl peroxide (PERBUTYL D-R, manufactured by NOF CORPORATION), t-butylcumyl peroxide (PERBUTYL C, manufactured by NOF CORPORATION), 2,5-dimethyl-2,5-bis(t-butylperoxy) hexane (PERHEXA 25B, manufactured by NOF CORPORATION), dicumyl peroxide (PERCUMYL D-R, manufactured by NOF CORPORATION), and α,α'-bis(t-butylperoxy) diisopropylbenzene (PERBUTYL P, manufactured by NOF CORPORATION), diacyl peroxides such as octanoyl peroxide (PEROYL O, manufactured by NOF CORPORATION), lauroyl peroxide (PEROYL L, manufactured by NOF CORPORATION), stearoyl peroxide (PEROYL S, manufactured by NOF CORPORATION), succinic acid peroxide (PER- OYL SA, manufactured by NOF CORPORATION), benzoyl peroxide (NYPER BW, manufactured by NOF CORPORATION), isobutylyl peroxide (PEROYL IB, manufactured by NOF CORPORATION), 2,4-dichlorobenzoyl peroxide (NYPER CS, manufactured by NOF CORPORATION), and 3,5,5-trimethylhexanoyl peroxide (PEROYL 355, manufactured by NOF CORPORATION), peroxydicarbonates such as di-n-propyl peroxy dicarbonate (PEROYL NPP-50M, manufactured by NOF CORPORATION), diisopropyl peroxy dicarbonate (PEROYL IPP-50, manufactured by NOF CORPORATION), bis(4-t-butylcyclohexyl) peroxy dicarbonate (PEROYL TCP, manufactured by NOF CORPORATION), di-2-ethoxyethyl peroxy dicarbonate (PEROYL EEP, manufactured by NOF CORPORATION), di-2-ethoxyhexyl peroxy dicarbonate (PEROYL OPP, manufactured by NOF CORPORATION), di-2-methoxybutyl peroxy dicarbonate (PEROYL MBP, manufactured by NOF CORPORATION), di(3-ethyl-3-methoxybutyl) peroxy dicarbonate (PEROYL SOP, manufactured by NOF CORPORATION), peroxyesters such as α,α'-bis(neodecanoylperoxy) diisopropylbenzene (NYPER ND-R, manufactured by NOF CORPORATION), cumyl peroxyneodecanoate (PERCUMYL ND-R, manufactured by NOF CORPORATION), 1,1,3,3-tetramethylbutyl peroxyneodecanoate (PEROCTA ND-R, manufactured by NOF CORPORATION), 1-cyclohexyl-1-methylethyl peroxyneodecanoate (PERCYCLO ND-R, manufactured by NOF CORPORATION), t-hexyl peroxyneodecanoate (PERHEXYL ND-R, manufactured by NOF CORPORATION), t-butyl peroxyneodecanoate (PERBUTYL ND-R, manufactured by NOF CORPORATION), t-hexyl peroxypivalate (PERHEXYL PV, manufactured by NOF CORPORATION), t-butyl peroxypivalate (PERBUTYL PV, manufactured by NOF CORPORATION), 1,1,3,3-tetramethylbutyl peroxy-2-ethylhexanoate (PEROCTA O, manufactured by NOF CORPORATION), 2,5-dimethyl-2,5-bis(2-ethylhexanoylperoxy) hexane (PERHEXA 250, manufactured by NOF CORPORATION), 1-cyclohexyl-1-methylethyl peroxy-2-ethylhexanoate (PERCYCLO O, manufactured by NOF CORPORATION), t-hexyl peroxy-2-ethylhexanoate (PERHEXYL O, manufactured by NOF CORPORATION), t-butyl peroxy-2-ethylhexanoate (PERBUTYL O, manufactured by NOF CORPORATION), t-butyl peroxyisobutyrate (PERBUTYL IB, manufactured by NOF CORPORATION), t-hexyl peroxyisopropylmonocarbonate (PERHEXYL I, manufactured by NOF CORPORATION), t-butyl peroxymaleic acid (PERBUTYL MA, manufactured by NOF CORPORATION), t-butyl peroxy 3,5,5-trimethylhexanoate (PERBUTYL 355, manufactured by NOF CORPORATION), t-butyl peroxylaurate (PERBUTYL L, manufactured by NOF CORPORATION), 2,5-dimethyl-2,5-bis(m-toluoylperoxy) hexane (PERHEXA 25MT, manufactured by NOF CORPORATION), t-butyl peroxyisopropylmonocarbonate (PERBUTYL I, manufactured by NOF CORPORATION), t-butyl peroxy-2-ethylhexylmonocarbonate (PERBUTYL E, manufactured by NOF CORPORATION), t-hexyl peroxybenzoate (PERHEXYL Z, manufactured by NOF CORPORATION), 2,5-dimethyl-2,5-bis(benzoylperoxy) hexane (PERHEXA 25Z, manufactured by NOF CORPORATION), t-butyl peroxyacetate (PERBUTYL A, manufactured by NOF CORPORATION), t-butyl peroxy-m-toluoylbenzoate (PERBUTYL ZT, manufactured by NOF CORPORATION), t-butyl peroxybenzoate (PERBUTYL Z, manufactured by NOF CORPORATION), and bis(t-butylperoxy) isophthalate (PERBUTYL IF, manufactured by NOF CORPORATION), t-butyl peroxyallylmonocarbonate (PEROMER AC, manufactured by NOF CORPORATION), t-butyltrimethylsilyl peroxide (PERBUTYL SM, manufactured by NOF CORPORATION), 3,3'-4,4'-tetra(t-butylperoxycarbonyl) benzophenone (BTTB-50, manufactured by NOF CORPORATION), and 2,3-dimethyl-2,3-diphenylbutane (NOFMER BC, manufactured by NOF CORPORATION).

Examples of the ionic initiator comprise cationic initiators such as 2,2'-azobis[2-(phenylamidino) propane] dihydrochloride (VA-545, manufactured by Wako Pure Chemical Industries, Ltd.), 2,2'-azobis {2-[N-(4-chlorophenyl) amidino] propane} dihydrochloride (VA-546, manufactured by Wako Pure Chemical Industries, Ltd.), 2,2'-azobis{2[N-(4-hydroxyphenyl) amidino] propane} dihydrochloride (VA-548, manufactured by Wako Pure Chemical Industries, Ltd.), 2,2'-azobis[2-(N-benzylamidino) propane] dihydrochloride (VA-552, manufactured by Wako Pure Chemical Industries, Ltd.), 2,2'-azobis[2-(N-allylamidino) propane] dihydrochloride (VA-553, manufactured by Wako Pure Chemical Industries, Ltd.), 2,2'-azobis(2-amidinopropane) dihydrochloride (VA-50, manufactured by Wako Pure Chemical Industries, Ltd.), 2,2'-azobis {2-[N-(4-hydroxyethyl) amidino] propane} dihydrochloride (VA-558, manufactured by Wako Pure Chemical Industries, Ltd.), 2,2'-azobis[2-(5-methyl-imidazoline-2-yl) propane] dihydrochloride (VA-041, manufactured by Wako Pure Chemical Industries, Ltd.), 2,2'-azobis[2-(2-imidazoline-2-yl) propane] dihydrochloride (VA-044, manufactured by Wako Pure Chemical Industries, Ltd.), 2,2'-azobis[2-(4,5,6,7-tetrahydro-1H-1,3-diazepine-2-yl) propane] dihydrochloride (VA-054, manufactured by Wako Pure Chemical Industries, Ltd.), 2,2'-azobis[2-(3,4,5,6-tetrahydropyrimidine-2-yl) propane] dihydrochloride (VA-058, manufactured by Wako Pure Chemical Industries, Ltd.), 2,2'-azobis[2-(5-hydroxy-3,4,5,6-tetrahydropyrimidine-2-yl) propane] dihydrochloride (VA-059, manufactured by Wako Pure Chemical Industries, Ltd.), 2,2'-azobis {2-[1-(2-hydroxyethyl)-2-imidazoline-2-yl] propane} dihydrochloride (VA-060, manufactured by Wako Pure Chemical Industries, Ltd.), and 2,2'-azobis[2-(2-imidazoline-2-yl) propane] (VA-061, manufactured by Wako Pure Chemical Industries, Ltd.), and anionic initiators such as potassium persulfate (KPS, manufactured by Wako Pure Chemical Industries, Ltd.) and ammonium persulfate (APS, manufactured by Wako Pure Chemical Industries, Ltd.).

Examples of the redox initiator comprise: a system based on an organic peroxide and a tertiary amine, such as a system based on benzoyl peroxide and dimethylaniline; and a system based on an organic hydroperoxide and a transition metal, such as a system based on cumene hydroperoxide and cobalt naphthate.

The initiator can be used in an ordinary amount, though the amount can be appropriately set in consideration of a molecular weight, a molecular weight distribution, and the like. Specifically, the initiator is used in an amount of typically 0.001 to 30 parts by mole, preferably 0.01 to 20 parts by mole with respect to 100 parts by mole of the polymerizable unsaturated compound to be polymerized.

<Reversible Addition-Fragmentation Chain Transfer Polymerization Method>

When the reversible addition-fragmentation chain transfer polymerization method is employed, a reaction is preferably performed with a chain transfer agent and an initiator at 0° C. to 200° C. In particular, the polymerization reaction temperature is more preferably set to fall within the range of 25° C. to 150° C. When the polymerization reaction temperature is set to fall within the above-mentioned range, the reaction can be stably advanced without being caused to run away. Even when an acrylic acid ester-based, polymerizable unsaturated compound having relatively high polymerizability is used, a reaction temperature of less than 0° C. results in poor efficiency because of the following reason, though the threshold temperature varies depending on the activity of an unsaturated group of the polymerizable unsaturated compound to be used. The activity reduces, and hence a time period required to achieve a sufficient rate of polymerization lengthens. Further, even when a compound having low polymerization activity such as a styrene-type unsaturated compound is used, a sufficient rate of polymerization can be achieved as long as a condition of 25° C. or more is satisfied. When the reversible addition-fragmentation chain transfer polymerization method is employed, a reaction time can be appropriately set in consideration of a rate of polymerization, a molecular weight, and the like. The reaction time is set to fall within the range of typically 30 minutes to 144 hours, preferably 1 to 24 hours under, for example, such condition as described above.

Examples of the chain transfer agent comprise benzoyl-1-pyrrole carbodithioate, benzoyl dithiobenzoate, cyanoisopropyl dithiobenzoate, cumyl dithiobenzoate, methoxycarbonylphenylmethyl dithiobenzoate, cyanobenzyl dithiobenzoate, 1-phenylethyl dithiobenzoate, t-butyl dithiobenzoate, S-(thiobenzyl) thioglycolic acid, 1-phenylethylphenyl dithiobenzoate, 3-benzylsulfanylthiocarbonylsulfanylpropionic acid, 2-(benzylsulfanylthiocarbonylsulfanyl) ethanol, 3-benzylsulfanylthiocarbonylsulfanyl propionic acid, S-(1-ethoxycarbonylethyl) O-ethyl xanthate, ethyl-2-(2-trifluoroethoxythiocarbonylsulfanyl) propionate, ethyl-2-(1-diethoxyphosphonyl-2,2,2-trifluoroethoxythiocarbonylsulfanyl) propionate, bisthiobenzoyl disulfide, bis(2,6-dimethylthiobenzoyl) disulfide, bis(2,4-dimethylthiobenzoyl) disulfide, bis(4-methoxythiobenzoyl) disulfide, bis(2,4-dimethoxythiobenzoyl) disulfide, bis(4-fluorothiobenzoyl) disulfide, bis(2,4-difluorothiobenzoyl) disulfide, bis(4-cyanothiobenzoyl) disulfide, bis(3,5-dicyanothiobenzoyl) disulfide, bis[3,5-bis(trifluoromethyl) dithiobenzoate] disulfide, bis(2,3,4,5,6-pentafluorothiobenzoyl) disulfide, bis(4-phenylthiobenzoyl) disulfide, bis(2-naphthylthionyl) disulfide, bis(1-naphthylthionyl) disulfide, triphenylmethyl dithioisonicotinate, 2-cyanoisopropyl(2,6-dimethyl) dithiobenzoate, 2-cyanoisopropyl(2,4-dimethyl) dithiobenzoate, 2-cyanoisopropyl(4-methoxy) dithiobenzoate, 2-cyanoisopropyl(2,4-dimethoxy) dithiobenzoate, 2-cyanoisopropyl(4-fluoro) dithiobenzoate, 2-cyanoisopropyl(2,4-difluoro) dithiobenzoate, 2-cyanoisopropyl dithioisonicotinate, 2-cyanoisopropyl 4-cyanodithiobenzoate, 2-cyanoisopropyl 3,5-dicyanodithiobenzoate, 2-cyanoisopropyl 3,5-bis(trifluoromethyl) dithiobenzoate, 2-cyanoisopropyl 2,3,4,5,6-pentafluorodithiobenzoate, 2-cyanoisopropyl 4-pyridiniumdithiocarboxylate 4-toluenesulfonate, 2-cyanoisopropyl(4-phenyl) dithiobenzoate, 2-cyanoisopropyl-2-naphthyl dithiolate, 2-cyanoisopropyl-1-naphthyl dithiolate, 2-cyano-4-methylpenta-2-yl dithiobenzoate, 2-cyano-4-methylpenta-2-yl 4-cyanodithiobenzoate, 2-cyano-4-methylpenta-2-yl 3,5-bistrifluoromethyldithiobenzoate, and 2-cyano-4-methylpenta-2-yl-4-methoxynil dithiobenzoate. One kind of those agents may be used alone, or two or more kinds thereof may be used in combination.

The chain transfer agent can be used in an ordinary amount, though the amount can be appropriately set in consideration of a molecular weight, a molecular weight distribution, and the like. Specifically, the chain transfer agent is used in an amount of typically 0.001 to 30 parts by mole, preferably 0.01 to 20 parts by mole with respect to 100 parts by mole of the polymerizable unsaturated compound to be polymerized.

Examples of the initiator comprise, but not particularly limited to, an azo-based initiator, a peroxide-based initiator, and an ionic initiator. One kind of those initiators may be used alone, or two or more kinds thereof may be used in combination.

Examples of the azo-based initiator comprise azonitrile compounds such as 2,2'-azobis(4-methoxy-2,4-dimethylvaleronitrile) (V-70, manufactured by Wako Pure Chemical Industries, Ltd.), 2,2'-azobis(2,4-dimethylvaleronitrile) (V-65, manufactured by Wako Pure Chemical Industries, Ltd.), 2,2'-azobisisobutyronitrile (V-60, manufactured by Wako Pure Chemical Industries, Ltd.), 2,2'-azobis(2-methylbutyronitrile) (V-59, manufactured by Wako Pure Chemical Industries, Ltd.), 1,1'-azobis(cyclohexane-1-carbonitrile) (V-40, manufactured by Wako Pure Chemical Industries, Ltd.), 1-[(1-cyano-1-methylethyl) azo] formamide (V-30, manufactured by Wako Pure Chemical Industries, Ltd.), and 2-phenylazo-4-methoxy-2,4-dimethyl-valeronitrile (V-19, manufactured by Wako Pure Chemical Industries, Ltd.), azoamide compounds such as 2,2'-azobis[2-methyl-N-[1,1-bis(hydroxymethyl)-2-hydroxyethyl] propionamide] (VA-080, manufactured by Wako Pure Chemical Industries, Ltd.), 2,2'-azobis[2-methyl-N-[1,1-bis(hydroxymethyl) ethyl] propionamide] (VA-082, manufactured by Wako Pure Chemical Industries, Ltd.), 2,2'-azobis[2-methyl-N-[2-(1-hydroxybutyl)] propionamide] (VA-085, manufactured by Wako Pure Chemical Industries, Ltd.), 2,2'-azobis[2-methyl-N-(2-hydroxyethyl) propionamide] (VA-086, manufactured by Wako Pure Chemical Industries, Ltd.), 2,2'-azobis(2-methylpropionamide) dihydrate (VA-088, manufactured by Wako Pure Chemical Industries, Ltd.), 2,2'-azobis[N-(2-propenyl)-2-methylpropionamide] (VF-096, manufactured by Wako Pure Chemical Industries, Ltd.), 2,2'-azobis(N-butyl-2-methylpropionamide) (VAm-110, manufactured by Wako Pure Chemical Industries, Ltd.), and 2,2'-azobis(N-cyclohexyl-2-methylpropionamide) (VAm-111, manufactured by Wako Pure Chemical Industries, Ltd.), and alkyl azo compounds such as 2,2'-azobis(2,4,4-trimethylpentane) (VR-110, manufactured by Wako Pure Chemical Industries, Ltd.), 2,2'-azobis(2-methylpropane) (VR-160, manufactured by Wako Pure Chemical Industries, Ltd.).

Examples of the peroxide-based initiator comprise ketone peroxides such as methyl ethyl ketone peroxide (PERMEK H, manufactured by NOF CORPORATION), cyclohexanone peroxide (PERHEXA H, manufactured by NOF CORPORATION), methylcyclohexanone peroxide (PERHEXA Q, manufactured by NOF CORPORATION), methyl acetoacetate peroxide (PERCURE SA, manufactured by NOF CORPORATION), and acetylacetone peroxide (PERCURE A, manufactured by NOF CORPORATION), peroxyketals such as 1,1-bis(t-hexylperoxy)-3,3,5-trimethylcyclohexane (PERHEXA TMH, manufactured by NOF CORPORATION), 1,1-bis(t-hexylperoxy) cyclohexane (PERHEXA HC, manufactured by NOF CORPORATION), 1,1-bis(t-butylperoxy)-3,3,5-trimethylcyc lohexane (PERHEXA 3M, manufactured by NOF CORPORATION), 1,1-bis(t-butylperoxy) cyclohexane (PERHEXA C, manufactured by NOF CORPORATION), 1,1-bis(t-butylperoxy) cyclododecane (PERHEXA CD-R, manufactured by NOF CORPORATION), 2,2'-bis(t-butylperoxy) butane (PERHEXA 22, manufactured by NOF CORPORATION), n-butyl 4,4-bis(t-butylperoxy) valerate (PERHEXA V, manufactured by NOF CORPORATION), and 2,2-bis(4,4-di-t-butylperoxycyclohexyl) propane (PERTETRA A, manufactured by NOF CORPORATION), hydroperoxides such as t-butylhydroperoxide (PERBUTYL H-69, manufactured by NOF CORPORATION), p-menthane hydroperoxide (PERMENTHA H, manufactured by NOF CORPORATION), diisopropylbenzene hydroperoxide (PERCUMYL P, manufactured by NOF CORPORATION), 1,1,3,3-tetramethylbutylhydroperoxide (PEROCTA H, manufactured by NOF CORPORATION), cumene hydroperoxide (PERCUMYL H-80, manufactured by NOF CORPORATION), and t-hexyl hydroperoxide (PERHEXYL H, manufactured by NOF CORPORATION), dialkyl peroxides such as 2,5-dimethyl-2,5-bis(t-butylperoxy) hexyne-3 (PERHEXYNE 25B, manufactured by NOF CORPORATION), di-t-butyl peroxide (PERBUTYL D-R, manufactured by NOF CORPORATION), t-butyl cumyl peroxide (PERBUTYL C, manufactured by NOF CORPORATION), 2,5-dimethyl-2,5-bis(t-butylperoxy) hexane (PERHEXA 25B, manufactured by NOF CORPORATION), dicumyl peroxide (PERCUMYL D-R, manufactured by NOF CORPORATION), and α,α'-bis(t-butylperoxy) diisopropylbenzene (PERBUTYL P, manufactured by NOF CORPORATION), diacyl peroxides such as octanoyl peroxide (PEROYL O, manufactured by NOF CORPORATION), lauroyl peroxide (PEROYL L, manufactured by NOF CORPORATION), stearoyl peroxide (PEROYL S, manufactured by NOF CORPORATION), succinic acid peroxide (PEROYL SA, manufactured by NOF CORPORATION), benzoyl peroxide (NYPER BW, manufactured by NOF CORPORATION), isobutylyl peroxide (PEROYL IB, manufactured by NOF CORPORATION), 2,4-dichlorobenzoyl peroxide (NYPER CS, manufactured by NOF CORPORATION), and 3,5,5-trimethylhexanoyl peroxide (PEROYL 355, manufactured by NOF CORPORATION), peroxydicarbonates such as di-n-propyl peroxydicarbonate (PEROYL NPP-50M, manufactured by NOF CORPORATION), diisopropyl peroxy-dicarbonate (PEROYL IPP-50, manufactured by NOF CORPORATION), bis(4-t-butylcyclohexyl) peroxydicarbonate (PEROYL TCP, manufactured by NOF CORPORATION), di-2-ethoxyethyl peroxydicarbonate (PEROYL EEP, manufactured by NOF CORPORATION), di-2-ethoxyhexyl peroxydicarbonate (PEROYL OPP, manufactured by NOF CORPORATION), di-2-methoxybutyl peroxydicarbonate (PEROYL MBP, manufactured by NOF CORPORATION), and di(3-methyl-3-methoxybutyl) peroxydicarbonate (PEROYL SOP, manufactured by NOF CORPORATION), peroxyesters such as α,α'-bis(neodecanoylperoxy) diisopropylbenzene (NYPER ND-R, manufactured by NOF CORPORATION), cumyl peroxyneodecanoate (PERCUMYL ND-R, manufactured by NOF CORPORATION), 1,1,3,3-tetramethylbutyl peroxyneodecanoate (PEROCTA ND-R, manufactured by NOF CORPORATION), 1-cyclohexyl-1-methylethyl peroxyneodecanoate (PERCYCLO ND-R, manufactured by NOF CORPORATION), t-hexyl peroxyneodecanoate (PERHEXYL ND-R, manufactured by NOF CORPORATION), t-butyl peroxyneodecanoate (PERBUTYL ND-R, manufactured by NOF CORPORATION), t-hexyl peroxypivalate (PERHEXYL PV, manufactured by NOF CORPORATION), t-butyl peroxypivalate (PERBUTYL PV, manufactured by NOF CORPORATION), 1,1,3,3-tetramethylbutyl peroxy-2-ethylhexanoate (PEROCTA O, manufactured by NOF CORPORATION), 2,5-dimethyl-2,5-bis(2-ethylhexanoylperoxy) hexane (PERHEXA 250, manufactured by NOF CORPORATION), 1-cyclohexyl-1-methylethyl peroxy-2-ethylhexanoate (PERCYCLO O, manufactured by NOF CORPORATION), t-hexyl peroxy-2-ethylhexanoate (PERHEXYL O, manufactured by NOF CORPORATION), t-butyl peroxy-2-ethylhexanoate (PERBUTYL O, manufactured by NOF CORPORATION), t-butyl peroxyisobutyrate (PERBUTYL IB, manufactured by NOF CORPORATION), t-hexyl peroxyisopropylmonocarbonate (PERHEXYL I, manufactured by NOF CORPORATION), t-butyl peroxymaleic acid (PERBUTYL MA, manufactured by NOF CORPORATION), t-butyl peroxy 3,5,5-trimethylhexanoate (PERBUTYL 355, manufactured by NOF CORPORATION), t-butyl peroxylaurate (PERBUTYL L, manufactured by NOF CORPORATION), 2,5-dimethyl-2,5-bis(m-toluoylperoxy) hexane (PERHEXA 25MT, manufactured by NOF CORPORATION), t-butyl peroxyisopropylmonocarbonate (PERBUTYL I, manufactured by NOF CORPORATION), t-butyl peroxy-2-ethylhexylmonocarbonate (PERBUTYL E, manufactured by NOF CORPORATION), t-hexyl peroxybenzoate (PERHEXYL Z, manufactured by NOF CORPORATION), 2,5-dimethyl-2,5-bis(benzoylperoxy) hexane (PERHEXA 25Z, manufactured by NOF CORPORATION), t-butyl peroxyacetate (PERBUTYL A, manufactured by NOF CORPORATION), t-butyl peroxy-m-toluoylbenzoate (PERBUTYL ZT, manufactured by NOF CORPORATION), t-butyl peroxybenzoate (PERBUTYL Z, manufactured by NOF CORPORATION), and bis(t-butyl peroxy) isophthalate (PERBUTYL IF, manufactured by NOF CORPORATION), t-butyl peroxyallylmonocarbonate (PEROMER AC, manufactured by NOF CORPORATION), t-butyltrimethylsilyl peroxide (PERBUTYL SM, manufactured by NOF CORPORATION), 3,3'-4,4'-tetra(t-butylperoxycarbonyl) benzophenone (BTTB-50, manufactured by NOF CORPORATION), and 2,3-dimethyl-2,3-diphenylbutane (NOFMER BC, manufactured by NOF CORPORATION).

Examples of the ionic initiator comprise cationic initiators such as 2,2'-azobis[2-(phenylamidino) propane] dihydrochloride (VA-545, manufactured by Wako Pure Chemical Industries, Ltd.), 2,2'-azobis {2-[N-(4-chlorophenyl) amidino] propane} dihydrochloride (VA-546, manufactured by Wako Pure Chemical Industries, Ltd.), 2,2'-azobis {2[N-(4-hydroxyphenyl) amidino] propane} dihydrochloride (VA-548, manufactured by Wako Pure Chemical Industries, Ltd.), 2,2'-azobis[2-(N-benzylamidino) propane] dihydrochloride (VA-552, manufactured by Wako Pure Chemical Industries, Ltd.), 2,2'-azobis[2-(N-allylamidino) propane] dihydrochloride (VA-553, manufactured by Wako Pure Chemical Industries, Ltd.), 2,2'-azobis(2-amidinopropane) dihydrochloride (VA-50, manufactured by Wako Pure Chemical Industries, Ltd.), 2,2'-azobis {2-[N-(4-hydroxyethyl) amidino] propane} dihydrochloride (VA-558, manufactured by Wako Pure Chemical Industries, Ltd.), 2,2'-azobis[2-(5-methyl-2-imidazoline-2-yl) propane] dihydrochloride (VA-041, manufactured by Wako Pure Chemical Industries, Ltd.), 2,2'-azobis[2-(2-imidazoline-2-yl) propane] dihydrochloride (VA-044, manufactured by Wako Pure Chemical Industries, Ltd.), 2,2'-azobis[2-(4,5,6,7-tetrahydro-1H-1,3-diazepine-2-yl) propane] dihydrochloride (VA-054, manufactured by Wako Pure Chemical Industries, Ltd.), 2,2'-azobis[2-(3,4,5,6-tetrahydropyrimidin-2-yl) propane] dihydrochloride (VA-058, manufactured by Wako Pure Chemical Industries, Ltd.), 2,2'-azobis[2-(5-hydroxy-3,4,5,6-tetrahydropyrimidin-2-yl) propane] dihydrochloride (VA-059, manufactured by Wako Pure Chemical Industries, Ltd.), 2,2'-azobis{2-[1-(2-hydroxyethyl)-2-imidazoline-2-yl] propane} dihydrochloride (VA-060, manufactured by Wako Pure Chemical Industries, Ltd.), and 2,2'-azobis[2-(2-imidazoline-2-yl) propane] (VA-061, manufactured by Wako Pure Chemical Industries, Ltd.), and anionic initiators such as potassium persulfate (KPS, manufactured by Wako Pure Chemical Industries, Ltd.) and ammonium persulfate (APS, manufactured by Wako Pure Chemical Industries, Ltd.).

The initiator can be used in an ordinary amount, though the amount can be appropriately set in consideration of a molecular weight, a molecular weight distribution, and the like. Specifically, the initiator is used in an amount of typically 0.001 to 30 parts by mole, preferably 0.01 to 20 parts by mole with respect to 100 parts by mole of the polymerizable unsaturated compound to be polymerized.

<Polymerization Method Involving Using Thiol Compound Having Reactive Silyl Group and Metallocene Compound>

A reaction is preferably performed with a metallocene compound as a metal catalyst and with a thiol compound having at least one reactive silyl group in a molecule thereof at 0° C. to 150° C. In particular, the polymerization reaction temperature is more preferably set to fall within the range of 25° C. to 120° C. When the polymerization reaction temperature is set to fall within the above-mentioned range, the reaction can be stably advanced without being caused to run away. Even when an acrylic acid ester-based, polymerizable unsaturated compound having relatively high polymerizability is used, a reaction temperature of less than 0° C. results in poor efficiency because of the following reason, though the threshold temperature varies depending on the activity of an unsaturated group of the polymerizable unsaturated compound to be used. The activity reduces, and hence a time period required to achieve a sufficient rate of polymerization lengthens. Further, even when a compound having low polymerization activity such as a styrene-type unsaturated compound is used, a sufficient rate of polymerization can be achieved as long as a condition of 25° C. or more is satisfied. When the polymerization method is employed, a reaction time can be appropriately set in consideration of a rate of polymerization, a molecular weight, and the like. The reaction time is set to fall within the range of typically 1 to 12 hours, preferably 2 to 8 hours under, for example, such condition as described above.

Examples of the above-mentioned metallocene compounds comprise, but not particularly limited to: titanocene compounds such as dicyclopentadiene-Ti-dichloride, dicyclopentadiene-Ti-bisphenyl, dicyclopentadiene-Ti-bis-2,3,4,5,6-pentafluorophen-1-yl, dicyclopentadiene-Ti-bis-2,3,5,6-tetrafluorophen-1-yl, dicyclopentadiene-Ti-bis-2,5,6-trifluorophen-1-yl, dicyclopentadiene-Ti-bis-2,6-difluorophen-1-yl, dicyclopentadiene-Ti-bis-2,4-difluorophen-1-yl, dimethylcyclopentadienyl-Ti-bis-2,3,4,5,6-pentafluorophen-1-yl, dimethylcyclopentadienyl-Ti-bis-2,3,5,6-tetrafluorophen-1-yl, dimethylcyclopentadienyl-Ti-bis-2,6-difluorophen-1-yl, and dimethylcyclopentadienyl-Ti-bis-2,6-difluoro-3-(pyr-1-yl)-phen-1-yl; zirconocene compounds such as dicyclopentadienyl-Zr-dichloride, dicyclopentadiene-Zr-bisphenyl, dicyclopentadiene-Zr-bis-2,3,4,5,6-pentafluorophen-1-yl, dicyclopentadiene-Zr-bis-2,3,5,6-tetrafluorophen-1-yl, dicyclopentadiene-Zr-bis-2,5,6-trifluorophen-1-yl, dicyclopentadiene-Zr-bis-2,6-difluorophen-1-yl, dicyclopentadiene-Zr-bis-2,4-difluorophen-1-yl, dimethylcyclopentadienyl-Zr-bis-2,3,4,5,6-pentafluorophen-1-yl, dimethylcyclopentadienyl-Zr-bis-2,3,5,6-tetrafluorophen-1-yl, dimethylcyclopentadienyl-Zr-bis-2,6-difluorophen-1-yl, and dimethylcyclopentadienyl-Zr-bis-2,6-difluoro-3-(pyr-1-yl)-phen-1-yl); and dicyclopentadienyl-V-chloride, bismethylcyclopentadienyl-V-chloride, bispentamethylcyclopentadienyl-V-chloride, dicyclopentadienyl-Ru-chloride, and dicyclopentadienyl-Cr-chloride. One kind of those compounds may be used alone, or two or more kinds thereof may be used in combination.

The metallocene compound can be used in an ordinary catalytic amount. Specifically, the metallocene compound is used in an amount of typically 0.1 to 0.00001 parts by mole, preferably 0.0001 to 0.00005 parts by mole with respect to 100 parts by mole of the polymerizable unsaturated compound to be polymerized.

Examples of the above-mentioned thiol compound having a reactive silyl group comprise, but not particularly limited to, mercaptomethyltrimethoxysilane, mercaptomethylmethyldimethoxysilane, mercaptomethyldimethylmethoxysilane, mercaptomethyltriethoxysilane, mercaptomethylmethyldiethoxysilane, mercaptomethyldimethylethoxysilane, mercaptomethyltripropoxysilane, mercaptomethylmethyldipropoxysilane, mercaptomethyldimethylpropoxysilane, 3-mercaptopropyl-trimethoxysilane, 3-mercaptopropyl-trimethoxysilane, 3-mercaptopropyl-triethoxysilane, 3-mercaptopropyl-monomethyl-dimethoxysilane, 3-mercaptopropyl-monophenyldimethoxysilane, 3-mercaptopropyl-dimethylmonomethoxysilane, 3-mercaptopropyl-monomethyldiethoxysilane, 4-mercaptobutyl-trimethoxysilane, and 3-mercaptobutyl-trimethoxysilane. One kind of those compounds may be used alone, or two or more kinds thereof may be used in combination.

The usage of the thiol compound having a reactive silyl group can be appropriately set in consideration of the molecular weight of a polymer to be obtained, a polymerization velocity, and the like. In order that the reaction may be smoothly advanced and that the reaction may not be caused to run away, the metallocene compound and the thiol compound having a reactive silyl group are used at a molar ratio in the range of typically 100:1 to 1:50,000, preferably 10:1 to 1:10,000.

<Radical Polymerization Method Involving Using Transition Metal Complex>

When the radical polymerization method involving using a transition metal complex is employed, a reaction is preferably performed with a transition metal complex, an organic halide, and/or a ligand at 0° C. to 200° C. In particular, the polymerization reaction temperature is more preferably set to fall within the range of 25° C. to 150° C. When the polymerization reaction temperature is set to fall within the above-mentioned range, the reaction can be stably advanced without being caused to run away. Even when an acrylic acid ester-based, polymerizable unsaturated compound having relatively high polymerizability is used, a reaction temperature of less than 0° C. results in poor efficiency because of the following reason, though the threshold temperature varies depending on the activity of an unsaturated group of the polymerizable unsaturated compound to be used. The activity reduces, and hence a time period required to achieve a sufficient rate of polymerization lengthens. Further, even when a compound having low polymerization activity such as a styrene-type unsaturated compound is used, a sufficient rate of polymerization can be achieved as long as a condition of 25° C. or more is satisfied. When the reversible addition-fragmentation chain transfer polymerization method is employed, a reaction time can be appropriately set in consideration of a rate of polymerization, a molecular weight, and the like. The reaction time is set to fall within the range of typically 30 minutes to 144 hours, preferably 1 to 24 hours under, for example, such condition as described above.

The transition metal complex is not particularly limited, and for example, those described in WO 97/18247 A1 can be utilized. Of those, for example, a complex of zero-valent copper, monovalent copper, divalent ruthenium, divalent iron, or divalent nickel is preferred. Of those, a copper complex is preferred. Specific examples of the monovalent copper compound comprise copper (I) chloride, copper (I) bromide, copper (I) iodide, copper (I) cyanide, copper (I) oxide, and copper (I) perchlorate. When copper (I) chloride, copper (I) bromide, copper (I) iodide, copper (I) cyanide, copper (I) oxide, or copper (I) perchlorate is used, zerovalent copper, copper (II) chloride, copper (II) bromide, or copper (II) iodide may also be used as required. In addition, a tristriphenylphosphine complex of divalent ruthenium chloride ($RuCl_2(PPh_3)_3$) is also suitable as a catalyst. When a ruthenium compound is used as a catalyst, an aluminum alkoxide are added as an activator. Further, a bistriphenylphosphine complex of divalent iron ($FeCl_2(PPh_3)_2$), a bistriphenylphosphine complex of divalent nickel ($NiCl_2(PPh_3)_2$), and a bistributylphosphine complex of divalent nickel ($NiBr_2(PBu_3)_2$) are also suitable as a catalyst.

When a copper compound is used as a catalyst, a ligand described in WO 97/18247 can be utilized as a ligand for the copper compound. The ligand is not particularly limited, and an amine-based ligand is preferred. Preferred examples thereof comprise ligands including bipyridyl compounds such as 2,2'-bipyridyl and derivatives thereof, 1,10-phenanthroline and derivatives thereof, and aliphatic amines such as hexamethyltriethylenetetraamine, bispicolylamine, trialkylamine, tetramethylethylenediamine, pentamethyldiethylenetriamine, and hexamethyl(2-aminoethyl) amine. In the present invention, of those, polyamine compounds, in particular, aliphatic polyamines such as pentamethyldiethylenetriamine and hexamethyl(2-aminoethyl) amine are preferred. In addition, when a polyamine compound, a pyridine-based compound, or an aliphatic amine compound is used as a ligand in the case where a copper compound is used as a catalyst, any such ligand preferably has three or more amino groups. It should be noted that the term "amino group" as used in the present invention refers to groups each having a nitrogen atom-carbon atom bond. Of those, such a group that a nitrogen atom is bonded only to a carbon atom and/or a hydrogen atom is preferred. Any one of the metallocene compounds listed above can also be used.

Under the conditions of ordinary atom transfer radical polymerization, the amount in which any such ligand as described above is used is determined from the number of coordinations of a transition metal and the number of ligands to coordinate, and is set to be substantially equal at all times. For example, in ordinary cases, 2,2'-bipyridyl or a derivative thereof is added at a molar ratio of two with respect to CuBr, and pentamethyldiethylenetriamine is added at a molar ratio of one with respect to CuBr. In the present invention, when the polymerization is initiated by adding a ligand and/or catalytic activity is controlled by adding a ligand, a metal atom is preferably excessive with respect to the ligand, though the extent to which the metal atom is excessive is not particularly limited. A ratio of coordinations to groups to coordinate is preferably 1.2 or more, more preferably 1.4 or more, particularly preferably 1.6 or more, still particularly preferably 2 or more.

An organic halide, in particular, an organic halide having a highly reactive carbon-halogen bond (such as a carbonyl compound having a halogen at an α-position or a compound having a halogen at a benzyl position), a halogenated sulfonyl compound, or the like is used as an initiator.

Specific examples thereof comprise $C_6H_5$—$CH_2X$, $C_6H_5$—$C(H)(X)CH_3$, $C_6H_5$—$C(X)(CH_3)_2$, $XCH_2$—$C_6H_5$—$CH_2X$, and $XC(H)(CH_3)$—$C_6H_5$—$C(H)(CH_3)X$ (provided that, in the above-mentioned chemical formulae, $C_6H_5$ represents a phenyl group, and X represents chlorine, bromine, or iodine), $R^6$—$C(H)(X)$—$CO_2R^7$, $R^6$—$C(CH_3)(X)$—$CO_2R^7$, $R^6$—$C(H)(X)$—$C(O)R^7$, and $R^6$—$C(CH_3)(X)$—$C(O)R^7$ (in the formulae, $R^6$ and $R^7$ each represent a hydrogen atom or an alkyl group having 1 to 20 carbon atoms, an aryl group, or an aralkyl group, and X represents chlorine, bromine or iodine), and $R^6$—$C_6H_4$-$5O_2X$ (in each of the above-mentioned formulae, $R^6$ represents a hydrogen atom or an alkyl group having 1 to 20 carbon atoms, an aryl group, or an aralkyl group, and X represents chlorine, bromine, or iodine).

In the radical polymerization method involving using a transition metal complex, an aluminum trialkylate such as triethoxyaluminum, tripropoxyaluminum, triisopropoxyaluminum, tri-n-butoxyaluminum, tri-t-butoxyaluminum, or tri-sec-butoxyaluminum, a divalent tin compound such as dioctyltin, diethylhexyltin, or dibutyltin, an organic substance such as glucose or ascorbic acid, or the like can be used as an additive for activating the polymerization.

In the syntheses of the vinyl-based resin (A), polymerization may be carried out without any solvent or in a variety of solvents. Examples of the solvent comprise: hydrocarbon-based solvents such as benzene, xylene, and toluene; ether-based solvents such as diethyl ether and tetrahydrofuran; halogenated hydrocarbon-based solvents such as methylene chloride and chloroform; ketone-based solvents such as acetone, methyl ethyl ketone, and methyl isobutyl ketone; alcohol-based solvents such as methanol, ethanol, propanol, isopropanol, n-butyl alcohol, and tert-butyl alcohol; nitrile-based solvents such as acetonitrile, propionitrile, and benzonitrile; ester-based solvents such as ethyl acetate and butyl acetate; carbonate-based solvents such as ethylene carbonate and propylene carbonate; and polyoxyalkylene polymers. One kind of the solvents may be used alone, or two or more kinds thereof may be used as a mixture.

In addition, the use of a reactive silyl group-containing polymer or the like as a solvent can obviate the need for a subsequent deaerating step or the like. In particular, (B) a urethane-based resin is preferably used as a solvent. The synthesisof the vinyl-based resin (A) with the urethane-based resin (B) as a solvent provides a resin composition containing the vinyl-based resin (A) and the urethane-based resin (B). The addition of (C) a curing catalyst to the resin composition can prepare the curable composition of the present invention. The urethane-based resin (B) may be further added as required.

The vinyl-based resin (A) of the present invention containing a structural unit represented by the following general formula (4) and a structural unit represented by the following general formula (5) isobtained by causing the compound (I) represented by the general formula (1) and the compound (II) represented by the general formula (2) to react with each other.

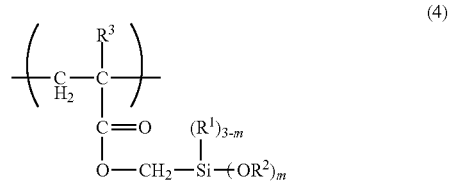

(4)

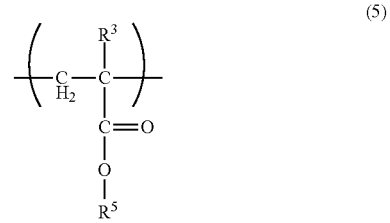

(5)

In the general formula (4), $R^1$ to $R^3$ and m are identical to $R^1$ to $R^3$ and m in the general formula (1), respectively. In the general formula (5), $R^4$ and $R^5$ are identical to $R^4$ and $R^5$ in the general formula (2), respectively.

The vinyl-based resin (A) of the present invention has a structural unit ratio between the structural unit represented by the general formula (4) and the structural unit represented by the general formula (5) of preferably 0.001:1 to 5:1, more preferably 0.005:1 to 0.22:1.

Although the number of the structural units represented by the general formula (4) in the vinyl-based resin (A) is not particularly limited, the number of the structural units in one molecule thereof is preferably 0.2 to 5, more preferably 0.5 to 3.0 on average. The number of the structural units represented by the general formula (5) in one molecule thereof is preferably 10 to 2,000, more preferably 15 to 1,000 on average.

Although the molecular weight of the vinyl-based resin (A) is not limited, the resin has a number average molecular weight of preferably 1,000 or more and 100,000 or less, more preferably 1,500 or more and 50,000 or less. One kind of the vinyl-based resins (A) may be used alone, or two or more kinds thereof may be used in combination.

The urethane-based resin (B) used in the present invention is a urethane-based resin obtained by causing a hydroxyl group-containing organic polymer, a polyisocyanate compound, a compound (III) represented by the above-mentioned general formula (3), and an amine compound to react with one another.

Although the hydroxyl group-containing organic polymer is not particularly limited as long as the organic polymer contains one or more hydroxyl groups in one molecule thereof, the organic polymer preferably has a hydroxyl group at a terminal thereof. The number of hydroxyl groups is suitably 1 to 5. The main chain of the hydroxyl group-containing organic polymer may be branched, or may be unbranched. In addition, the main chain may be constructed of various components. Examples of the main chain of the hydroxyl group-containing organic polymer comprise a polyoxyalkylene, a polyolefin (such as polyethylene, polybutadiene, an ethylene-olefin copolymer, or a styrene-butadiene copolymer), a polycarbonate, a polyester, a polyacrylate, a polymethacrylate, a polysiloxane, a polysiloxane-urea/urethane copolymer, a polyurethane, a polyurea, a polyether, a polystyrene, a polyamide, and a polyvinyl ester. An arbitrary mixture or combination formed of various main chain polymers can also be used.

The number average molecular weight of the hydroxyl group-containing organic polymer, which is not particularly limited, is preferably 4,500 or more, more preferably 5,000 to 50,000, particularly preferably 5,600 to 30,000 in order that the polymer may have additional flexibility. Meanwhile, a hydroxyl group-containing organic polymer having a number average molecular weight of less than 4,500 can also be used for securing workability at a low viscosity. A mixture of a low-molecular-weight body and a high-molecular-weight body can also be used in order that both the characteristics may be obtained.

In addition, an hydroxyl group-containing organic polymer having a ratio of its weight average molecular weight (Mw) to its number average molecular weight (Mn) (hereinafter, referred to as "Mw/Mn") of 1.7 or less is particularly preferably used as the hydroxyl group-containing organic polymer. In addition, the Mw/Mn is more preferably 1.6 or less, particularly preferably 1.5 or less. When hydroxyl group-containing organic polymers each having the same number average molecular weight (Mn) are compared, a polymer having a smaller Mw/Mn shows a reduced viscosity, and is excellent in workability. In addition, when a urethane-based resin obtained by using the polymer as a raw material is cured, the cured product shows a larger elongation and a higher strength than those of a cured product obtained by using a raw material except the above-mentioned polymer and having the same elastic modulus as that of the above-mentioned cured product.

The hydroxyl group-containing organic polymer is particularly preferably a hydroxyl group-containing oxyalkylene-based polymer. The oxyalkylene-based polymer is preferably a polymer having a hydroxyl group terminal produced by subjecting a cyclic ether and the like to a reaction in the presence of a catalyst and an initiator.

An active hydrogen compound such as a hydroxy compound having one or more hydroxyl groups can be used as the initiator. Examples of the cyclic ether comprise alkylene oxides such as ethylene oxide, propylene oxide, butylene oxide, hexylene oxide, and tetrahydrofuran. One kind of the cyclic ethers may be used alone, or two or more kinds thereof may be used in combination. Examples of the catalyst comprise alkali metal catalysts such as a potassium-based compound and a cesium-based compound, composite metal cyanide complex catalysts, metal porphyrin catalysts, and phosphazenium catalysts such as a phosphazene and a phosphazenium each having a nitrogen-phosphorus double bond. In the present invention, the catalyst that has been used is preferably removed after the completion of ring-opening polymerization.

A polyoxyalkylene polyol or a derivative thereof is particularly preferred as the hydroxyl group-containing polyoxyalkylene-based polymer described in the foregoing. The polyoxyalkylene polyol is preferably a dihydric to octahydric polyoxypropylene polyol, more preferably a polyoxypropylene diol or a polyoxypropylene triol. The derivative of the polyoxyalkylene polyol is preferably a derivative obtained by introducing a functional group to a terminal of the polyoxyalkylene polyol, and is, for example, a polyoxyalkylene polyol derivative having an olefin group introduced to a terminal thereof.

The hydroxyl group value of the polyoxyalkylene polyol, which is not particularly limited, is preferably 25 mgKOH/g or less, more preferably 1 to 22 mgKOH/g, particularly preferably 2 to 20 mgKOH/g in order that the polyoxyalkylene polyol may have additional flexibility. Meanwhile, a polyoxyalkylene polyol having a hydroxyl group value of 25 mgKOH/g or more can also be used for securing workability at a low viscosity. A mixture of a polyoxyalkylene polyol having a low hydroxyl group value and a polyoxyalkylene polyol having a high hydroxyl group value can also be used in order that both the characteristics may be obtained. In addition, the polyoxyalkylene polyol preferably has a total degree of unsaturation of 0.04 meq/g or less. When the hydroxyl group value and the total degree of unsaturation fall within the above-mentioned ranges, a resin having the following characteristic can be obtained: a product obtained by curing the resin with moisture is excellent in flexibility.

In addition, the polyoxyalkylene polyol has preferably two to five hydroxyl groups, more preferably two hydroxyl groups in one molecules thereof. As long as the number of hydroxyl groups of the polyoxyalkylene polyol falls within the above-mentioned range, a change over time such as thickening hardly occurs even when the polyoxyalkylene polyol is mixed with a compound having a functional group capable of reacting with a hydroxyl group.

Of such polyoxyalkylene polyols, one obtained by polymerizing a cyclic ether by using a composite metal cyanide complex or a phosphazenium catalyst as a catalyst in the presence of an initiator is particularly preferred.

The composite metal cyanide complex is preferably any one of complexes each mainly formed of zinc hexacyanocobaltate, and out of those complexes, an ether complex and/or an alcohol complex are/is preferred. The composition essentially described in JP 46-27250 B can be used for the complex. In this case, the ether is preferably, for example, ethylene glycol dimethyl ether (glyme) or diethylene glycol dimethyl ether (diglyme), and glyme is particularly preferred from the viewpoint of the ease of handling at the time of the production of the complex. t-Butanol is preferably used as an alcohol in the complex.

Examples of the phosphazenium catalyst comprise dimethylaminotris[tris(dimethylamino) phospholanylideneamino] phosphonium tetrafluoroborate, tetrakis[tri(pyrrolidin-1-yl) phospholanylideneamino] phosphonium tetrafluoroborate, tetrakis[tris(dimethylamino) phospholanylideneamino] phosphonium chloride, and diethylaminotris[tris(diethylamino) phospholanylideneamino] phosphonium tetrafluoroborate. Of those, there are given phosphazenium salts of active hydrogen compounds such as tetrakis [tris(dimethylamino) phospholanylideneamino] phosphonium chloride, and tetrakis[tris(dimethylamino) phospholanylideneamino] phosphonium hydroxide and (dimethylamino) tris[tris(dimethylamino) phospholanylideneamino] phosphonium hydroxide. Of those, phosphazenium hydroxides such as tetrakis[tris(dimethylamino) phospholanylideneamino] phosphonium hydroxide are suitably used.

An active hydrogen compound is used as the above-mentioned initiator. The active hydrogen compound is not particularly limited as long as the active hydrogen compound is typically used in the production of the polyoxyalkylene polyol. Examples of such active hydrogen compound comprise: alkylene glycols such as ethylene glycol and propylene glycol; triols such as glycerin and trimethylolpropane; tetraols such as pentaerythritol and diglycerin; hexaols such as sorbitol; and hydroxyl group-containing compounds such as sucrose. One kind of the active hydrogen compounds may be used alone, or two kinds thereof may be used in combination.

Examples of the above-mentioned cyclic ether comprise alkylene oxides such as ethylene oxide and propylene oxide. One kind of the cyclic ethers may be used alone, or two kinds thereof may be used in combination. Of those, propylene oxide is preferably used alone, or ethylene oxide and propylene oxide are preferably used in combination. That is, the above-mentioned polyoxyalkylene polyol preferably contains at least an oxypropylene unit.

In the present invention, in addition to a polyoxyalkylene polyol obtained by the ring-opening addition polymerization of the cyclic ether to the active hydrogen compound as described above, a polyoxyalkylene polyol with its molecular weight increased with a methylene halide by a known method or increased by, for example, the condensation of an ester or hydroxyl group can also be used.

A polyoxyalkylene polyol obtained by causing a polyoxyalkylene polyol having a relatively low molecular weight produced by using an alkali metal catalyst or the like to react with a polyvalent halogen compound to increase the molecular weight is particularly preferably used.

Specific examples of the polyvalent halogen compound comprise methylene chloride, monochlorobromomethane, methylene bromide, methylene iodide, 1,1-dichloro-2,2-dimethylpropane, benzal chloride, bis(chloromethyl) benzene, tris(chloromethyl) benzene, bis(chloromethyl) ether, bis(chloromethyl) thioether, bis(chloromethyl) formal, tetrachloroethylene, trichloroethylene, 1,1-dichloroethylene, 1,2-dichloroethylene, and 1,2-dibromoethylene. Of those, methylene chloride and monochlorobromomethane are particularly preferred.

Although the polyisocyanate compound is not particularly limited as long as the compound has two or more isocyanate groups, the compound is suitably a diisocyanate compound. One kind of such compounds may be used alone, or two or more kinds thereof may be used in combination.

Examples of the diisocyanate compound comprise aliphatic, alicyclic, aromatic aliphatic, and aromatic diisocyanate compounds and other diisocyanate compounds. Specific examples thereof are as follows:

aliphatic diisocyanate compounds such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, and 2,6-diisocyanatomethyl caproate;

alicyclic diisocyanate compounds such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate, 4,4'-methylenebis (cyclohexylisocyanate), methyl-2,4-cyclohexane diisocyanate, methyl-2,6-cyclohexane diisocyanate, 1,3-bis(isocyanatomethyl) cyclohexane, 1,4-bis(isocyanatomethyl) cyclohexane, and isophorone diisocyanate;

aromatic aliphatic diisocyanate compounds such as 1,3- or 1,4-xylylene diisocyanate or a mixture thereof, ω,ω'-diisocyanato-1,4-diethylbenzene, and 1,3- or 1,4-bis(1-isocyanato-1-methylethyl) benzene or a mixture thereof;

aromatic diisocyanate compounds such as m-phenylene diisocyanate, p-phenylene diisocyanate, 4,4'-diphenyl diisocyanate, 1,5-naphthalene diisocyanate, 4,4'-diphenylmethane diisocyanate, 2,4- or 2,6-tolylene diisocyanate, 4,4'-toluidine diisocyanate, and 4,4'-diphenyl ether diisocyanate; and other diisocyanate compounds such as diisocyanates each containing a sulfur atom including phenyl diisothiocyanate.

Of the above-mentioned diisocyanate compounds, 2,4- or 2,6-tolylene diisocyanate, 4,4'-diphenylmethane diisocyanate, hexamethylene diisocyanate, 1,3- or 1,4-xylylene diisocyanate or a mixture thereof, isophorone diisocyanate, 1,3-bis(isocyanatomethyl) cyclohexane, 1,4-bis(isocyanatomethyl) cyclohexane, and 4,4'-methylene-bis(cyclohexylisocyanate) are preferred. In addition, when the aliphatic diisocyanate compound is used, a resin which hardly causes a color change can be obtained.

In the compound (III), $R^{11}$ in the general formula (3) represents an alkyl group having 1 to 18 carbon atoms, an alkenyl group, an aryl group, or a phenyl group, preferably an alkyl group having 1 to 18 carbon atoms, an aryl group having 6 to 20 carbon atoms, or an aralkyl group having 7 to 20 carbon atoms, most preferably a methyl group. When a plurality of $R^{11}$s exist, the $R^{11}$s may be identical to or different from each other. $R^{12}$ represents an alkyl group having 1 to 4 carbon atoms, an alkenyl group, an aryl group, or a phenyl group, preferably a methyl group. When a plurality of $R^{12}$s exist, the $R^{12}$s may be identical to or different from each other. $R^{13}$ represents hydrogen or a methyl group. n represents 1, 2, or 3, more preferably 3 in terms of rapid curability.

Specifically, the same examples as those listed in the compound (I) are each suitably used as the compound (III).

One kind of those compounds may be used alone, or two or more kinds thereof may be used in combination.

Although the amine compound can be selected from a wide variety of known amine compounds without any particular limitation, a compound having one or more of one, or each of both, of primary amino groups and secondary amino groups in a molecule thereof is suitably used. One kind of such compounds may be used alone, or two or more kinds thereof may be used in combination.

Specifically, a primary amine is suitable as the compound having a primary amino group. Examples of the primary amine comprise: monoamines such as methylamine, ethylamine, propylamine, isopropylamine, butylamine, isobutylamine, 2-butylamine, 1,2-dimethylpropylamine, hexylamine, heptylamine, 2-ethylhexylamine, nonylamine, decylamine, amylamine, octylamine, 3-pentylamine, isoamylamine, 2-octylamine, 3-methoxypropylamine, 3-propoxypropylamine, 3-butoxypropylamine, 3-isobutoxypropylamine, laurylamine, pentadecylamine, rosin amine, tetradecylamine, pentadecylamine, cetylamine, stearylamine, cyclohexylamine, trimethylcyclohexylamine, benzylamine, aniline, 3-aminopropyltrimethoxysilane, 3-aminopropyltriethoxysilane, 3-aminopropylmethyldimethoxysilane, 3-aminopropylmethyldiethoxysilane, aminomethyltrimethoxysilane, aminomethylaminomethyltriethoxysilane, aminomethylmethyldimethoxysilane, aminomethylmethyldiethoxysilane, aminomethyldimethylmethoxysilane, and aminomethyldimethylethoxysilane; diamines such as ethylenediamine, 1,3-diaminopropane, 1,2-diaminopropane, 1,4-diaminobutane, hexamethylenediamine, 1,7-diaminoheptane, trimethylhexamethylenediamine, 1,8-diaminooctane, 1,9-diaminononane, 1,10-diaminodecane, 1,11-diaminoundecane, 1,12-diaminododecane, 1,13-diaminotridecane, 1,14-diaminotetradecane, 1,15-diaminopentadecane, 1,16-diaminohexadecane, 1,17-diaminoheptadecane, 1,18-diaminooctadecane, 1,19-diaminononadecane, 1,20-diaminoeicosane, 1,21-diaminoheneicosane, 1,22-diaminodocosane, 1,23-diaminotricosane, 1,24-diaminotetracosane, isophoronediamine, diaminodicyclohexylmethane, 3,9-bis(3-aminopropyl)-2,4,8,10-tetraoxaspiro(5,5)undecane, xylenediamine, phenylenediamine, diaminodiphenylmethane, diaminodiethylphenylmethane, polyoxyethylenediamine, and polyoxypropylenediamine; and polyamines such as tri(m-ethylamino) hexane.

Further, examples of the compound having a plurality of primary amino groups comprise N-methyl-3,3'-iminobis(propylamine), diethylenetriamine, triethylenediamine, pentaethylenediamine, 1,4-diaminobutane, 1,2-diaminopropane, 3,9-bis(3-aminopropyl)-2,4,8,10-tetraoxaspiro[5,5]undecane (ATU), CTU guanamine, dodecanoic acid dihydrazide, hexamethylenediamine, m-xylylenediamine, dianisidine, 4,4'-diamino-3,3'-diethyldiphenylmethane, diaminodiphenyl ether, 3,3'-dimethyl-4,4'-diaminodiphenylmethane, tolidine base, m-toluylenediamine, o-phenylenediamine, m-phenylenediamine, p-phenylenediamine, and melamine.

Examples of the compound having one or more primary amino groups and secondary amino groups in a molecule thereof comprise methylaminopropylamine, ethylaminopropylamine, ethylaminoethylamine, laurylaminopropylamine, 2-hydroxyethylaminopropylamine, 1-(2-aminoethyl) piperazine, N-aminopropylpiperazine, N-laurylpropylenediamine, N-stearylpropylenediamine, N-β(aminoethyl)-γ-aminopropyltrimethoxysilane, N-β(aminoethyl)-γ-aminopropyltriethoxysilane, N-β(aminoethyl)-γ-aminopropylmethyldimethoxysilane, N-β(aminoethyl)-γ-aminopropylmethyldiethoxysilane, N-β(aminoethyl)-γ-aminomethyltrimethoxysilane, N-β(aminoethyl)-γ-aminomethyltriethoxysilane, N-β(aminoethyl)-γ-aminomethylmethyldimethoxysilane, N-β(aminoethyl)-γ-aminomethylmethyldiethoxysilane, N-β(aminoethyl)-γ-aminomethyldimethylmethoxysilane, and N-β(aminoethyl)-γ-aminomethyldimethylethoxysilane.

Examples of the compound having one or more secondary amino groups alone in a molecule thereof comprise monoamines such as dimethylamine, diethylamine, dipropylamine, diisopropylamine, dibutylamine, diamylamine, dihexylamine, dioctylamine, di(2-ethylhexyl) amine, didecylamine, dilaurylamine, dicetylamine, distearylamine, methylstearylamine, ethylstearylamine, butylstearylamine, and methyllaurylamine, diamines such as N,N'-dilaurylpropylamine, N,N'-distearylbutylamine, N-butyl-N'-laurylethylamine, N-butyl-N'-laurylpropylamine and N-lauryl-N'-stearylbutylamine, piperazine, cis-2,6-dimethylpiperazine, cis-2,5-dimethylpiperazine, 2-methylpiperazine, N,N'-di-t-butylethylenediamine, 2-aminomethylpiperidine, 4-aminomethylpiperidine, 1,3-di-(4-piperidyl)-propane, 4-aminopropylaniline, 3-aminopyrrolidine, and homopiperazine.

Examples of the other amines comprise monoethanolamine, diethanolamine, triethanolamine, dimethylaminoethylamine, diethylaminoethylamine, 3-hydroxypropylamine, diethylenetriamine, triethylenetetramine, benzylamine, 3-lauryloxypropylamine, 3-dimethylaminopropylamine, 3-diethylaminopropylamine, N-methyl-1,3-propanediamine, xylylenediamine, ethylenediamine, hexamethylenediamine, triethylenediamine, guanidine, diphenylguanidine, 2,4,6-tris(dimethylaminomethyl) phenol, morpholine, N-methylmorpholine, 2-ethyl-4-methylimidazole, 1,8-diazabicyclo(5,4,4,0)undecene-7,1,5-diazabicyclo(4,3,0)nonene-5 (DBN), 3-(1-piperazinyl) propylamine, and 3-morpholinopropylamine.

Although the order of the steps of causing the hydroxyl group-containing organic polymer, the polyisocyanate compound, the compound (III), and the amine compound to react with one another in a method of producing the urethane-based resin (B) is not particularly limited, a urethane prepolymer obtained by causing the hydroxyl group-containing organic polymer and the polyisocyanate compound to react with each other, and a reaction product X obtained by causing the compound (III) and the amine compound to react with each other are preferably caused to react with each other.

Reaction conditions for the reaction between the hydroxyl group-containing organic polymer and the polyisocyanate compound (urethane prepolymer formation reaction) are not particularly limited, and the reaction has only to be performed in conformity with an ordinary method of producing a urethane prepolymer. The reaction is suitably performed at a reaction temperature of 50 to 150° C., preferably 50 to 120° C., more preferably 60 to 100° C. for 30 minutes to 10 hours. The reaction is desirably performed in the presence of an inert gas in order that contact with moisture in air during the reaction may be avoided. Examples of the inert gas comprise nitrogen and helium. Of those, nitrogen is preferred.

A reaction molar ratio between the hydroxyl group-containing organic polymer and the polyisocyanate compound falls within the range of preferably 1:1 to 1:30, more preferably 1:1.1 to 1:5.0.

In the urethane prepolymer formation reaction, a known catalyst for producing a polyurethane, such as an organometallic compound or an amine compound, may be used as a urethane prepolymer formation reaction catalyst and an organometallic catalyst is preferred. When the molecular weight of the hydroxyl group-containing organic polymer is large, that is, OHV is low, the catalyst may not be used.

Examples of the organometallic compound comprise stannous octylate, monobutyltin oxide, dibutyltin oxide, tin acetate, tin octylate, tin oleate, tin laurate, dibutyltin diacetate, dibutyltin dilaurate, dibutyltin dichloride, lead octoate, lead naphthenate, nickel naphthenate, and cobalt naphthenate.

Examples of the amine compound comprise triethylamine, tripropylamine, tributylamine, N,N,N',N'-tetramethylalkylenediamine, N-methylmorpholine, N-ethylmorpholine, dimethylcyclohexylamine, bis[2-(dimethylamino) ethyl] ether, triethylenediamine, and salts of triethylenediamine. It should be noted that when the amine compound is used as a urethane prepolymer formation reaction catalyst, the urethane-based resin (B) can be obtained by causing the compound (III) instead of the reaction product X obtained by causing the compound (III) and the amine compound to react with each other to react with the resultant urethane prepolymer. The urethane-based resin (B) is preferably obtained by causing the urethane prepolymer and the reaction product X to react with each other.

One kind of those urethane prepolymer formation reaction catalysts may be used alone, or two or more kinds thereof may be used in combination. The blending amount of the catalyst is preferably 1 wtppm or more and 10,000 wtppm or less, more preferably 10 wtppm or more and 1,000 wtppm or less with respect to the sum of the mass of the hydroxyl group-containing organic polymer and the mass of the polyisocyanate compound.

In the reaction between the hydroxyl group-containing organic polymer and the polyisocyanate compound, an alkoxysilane compound having an isocyanate group may be further subjected to the reaction. In this case, the order of the step of subjecting the alkoxysilane compound having an isocyanate group to the reaction is not particularly limited. After the hydroxyl group-containing organic polymer and the polyisocyanate compound have been caused to react with each other, the alkoxysilane compound having an isocyanate group may be caused to react with the resultant. Alternatively, after the hydroxyl group-containing organic polymer and the alkoxysilane compound having an isocyanate group have been caused to react with each other, the polyisocyanate compound may be caused to react with the resultant. Alternatively, the hydroxyl group-containing organic polymer, the polyisocyanate compound, and the alkoxysilane compound having an isocyanate group may be simultaneously caused to react with one another. A method involving causing the hydroxyl group-containing organic polymer and the alkoxysilane compound having an isocyanate group to react with each other and causing the reaction product and the polyisocyanate compound to react with each other, and a method involving simultaneously causing the hydroxyl group-containing organic polymer, the alkoxysilane compound having an isocyanate group, and the polyisocyanate compound to react with one another are more preferred. The alkoxysilane compound having an isocyanate group is preferably an isocyanatotrialkoxysilane such as 3-isocyanatopropyltriethoxysilane.

Although a method of causing the compound (III) and the amine compound to react with each other to provide the reaction product X is not particularly limited, the reaction is suitably performed at a reaction temperature of −20° C. to 150° C., preferably 0° C. to 80° C. for 5 minutes to 300 hours. When the reaction is performed at less than −20° C., the reaction requires a long time period, thereby resulting in poor production efficiency. A temperature in excess of 150° C. is not preferred because a side reaction may occur or thermal decomposition may occur. At this time, a polymerization inhibitor may be caused to exist in some cases.

A reaction molar ratio between the amine compound and the compound (III) is preferably 1:0.001 to 1:1,000, more preferably 1:0.1 to 1:10.

Although conditions for the reaction between the urethane prepolymer and the reaction product X are not particularly limited, the reaction is suitably performed at a reaction temperature of −20° C. to 150° C., preferably 0° C. to 80° C. for 5 minutes to 300 hours. When the reaction is performed at less than −20° C., the reaction requires a long time period, thereby resulting in poor production efficiency. A temperature in excess of 150° C. is not preferred because a side reaction may occur.

A reaction molar ratio between the reaction product X and the urethane prepolymer is preferably 1:0.001 to 1:1,000, more preferably 1:0.1 to 1:10.

Also suitable as another mode in the method of producing the urethane-based resin (B) is a method including the steps of: (a) causing the reaction product X obtained by causing the compound (III) and the amine compound to react with each other, and the polyisocyanate compound to react with each other to provide a reaction product Y; and (b) causing the reaction product Y obtained in the step (a) and the hydroxyl group-containing organic polymer to react with each other.

The method of causing the compound (III) and the amine compound to react with each other to provide the reaction product X in the step (a) has only to be performed in the same manner as in the foregoing.

Although a method of causing the reaction product X and the polyisocyanate compound to react with each other to provide the reaction product Y is not particularly limited, the reaction is suitably performed at a reaction temperature of −20° C. to 150° C., preferably 0° C. to 80° C. for 5 minutes to 300 hours. When the reaction is performed at less than −20° C., the reaction requires a long time period, thereby resulting in poor production efficiency. A temperature in excess of 150° C. is not preferred because a side reaction may occur.

A reaction molar ratio between the reaction product X and the polyisocyanate compound is preferably 1:0.001 to 1:1, 000, more preferably 1:0.1 to 1:10.

Conditions for the reaction between the reaction product Y and the hydroxyl group-containing organic polymer are not particularly limited, and the reaction has only to be performed in conformity with an ordinary method of producing a urethane prepolymer. The reaction is suitably performed at 50 to 150° C. for 30 minutes to 10 hours. Any such urethane prepolymer formation reaction catalyst as described in the foregoing may be used in the reaction between the reaction product Y and the hydroxyl group-containing organic polymer.

A reaction molar ratio between the hydroxyl group-containing organic polymer and the reaction product Y is preferably 1:1 to 1:30, more preferably 1:1.1 to 1:5.0.

In the reaction between the reaction product Y and the hydroxyl group-containing organic polymer, an alkoxysilane compound having an isocyanate group may be further subjected to the reaction. In this case, the order of the step of subjecting the alkoxysilane compound having an isocyanate group to the reaction is not particularly limited. After the hydroxyl group-containing organic polymer and the reaction product Y have been caused to react with each other, the alkoxysilane compound having an isocyanate group may be caused to react with the resultant. Alternatively, after the hydroxyl group-containing organic polymer and the alkoxysilane compound having an isocyanate group have been caused to react with each other, the reaction product Y may be caused to react with the resultant. Alternatively, the hydroxyl group-containing organic polymer, the reaction product Y, and the alkoxysilane compound having an isocyanate group may be simultaneously caused to react with one another. A method involving causing the hydroxyl group-containing organic polymer and the alkoxysilane compound having an isocyanate group to react with each other and causing the reaction product and the reaction product Y to react with each other, and a method involving simultaneously causing the hydroxyl group-containing organic polymer, the alkoxysilane compound having an isocyanate group, and the reaction product Y to react with one another are more preferred.

The urethane-based resin (B) of the present invention having a terminal group represented by the following general formula (6) is obtained by causing the hydroxyl group-containing organic polymer, the polyisocyanate compound, the compound (III), and the amine compound to react with one another.

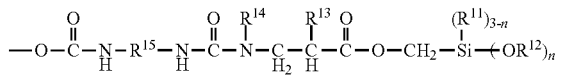

(6)

In the general formula (6), $R^{11}$ to $R^{13}$ and n are identical to $R^{11}$ to $R^{13}$ and n in the general formula (3) of the compound (III), respectively. $R^{14}$ represents a monovalent organic group derived from the amine compound used in the synthesis of the urethane-based resin (B), and $R^{15}$ represents a divalent organic group derived from the polyisocyanate compound used in the synthesis of the urethane-based resin (B).

The number average molecular weight of the urethane-based resin (B) is preferably 500 to 50,000, particularly preferably 1,000 to 30,000, though the preferred value varies depending on applications where the resin is used. When the number average molecular weight falls short of the above-mentioned range, desired physical properties may not be obtained. In addition, when the number average molecular weight outstrips the above-mentioned range, the resin has an increased viscosity, and hence tends to be poor in ease of handling.

A blending ratio of the urethane-based resin (B), which is not particularly limited, is preferably 1 to 10,000 parts by mass, more preferably 5 to 1,000 parts by mass with respect to 100 parts by mass of the vinyl-based resin (A). One kind of the urethane-based resins (B) may be used alone, or two or more kinds thereof may be used in combination.

Examples of the curing catalyst (C) comprise, but not particularly limited to, an amine compound and an organometallic compound. Of those, an amine compound and a silanol condensation catalyst are preferred, and an amine compound is more preferred.

Although the amine compound can be selected from a wide variety of known amine compounds without any particular limitation, for example, a compound having one or more of one, or each of both, of primary amino groups and secondary amino groups in a molecule thereof is suitably used. For example, any one of the amine compounds listed in the description of the urethane-based resin (B) is suitably used as the amine compound. In addition, aminosilanes such as aminoethylaminopropyltrimethoxysilane, aminoethylaminopropylmethyldimethoxysilane, aminoethylaminopropylmethylmethoxysilane, and aminopropyltrimethoxysilane are particularly preferably used as the amine compound.

Examples of the silanol condensation catalyst comprise: tin-based catalysts including organotin compounds such as stannous octoate, dibutyltin dioctoate, dibutyltin dilaurate, dibutyltin maleate, dibutyltin diacetate, dibutyltin diacetylacetonate, dibutyltin oxide, dimethyltin oxide, dioctyltin oxide, dibutyltin bistriethoxysilicate, dibutyltin distearate, dioctyltin dilaurate, dioctyltin diversatate, tin octylate, and tin naphthenate, and a reaction product of dibutyltin oxide and a phthalic acid ester; titanic acid esters such as tetrabutyl titanate and tetrapropyl titanate; organoaluminum compounds such as aluminum trisacetylacetonate, aluminum trisethylacetoacetate, and diisopropoxyaluminum ethylacetoacetate; chelate compounds such as zirconium tetraacetylacetonate and titanium tetraacetylacetonate; organic acid lead salts such as lead octylate and lead naphthenate; organic acid bismuth salts such as bismuth octylate, bismuth neodecanoate, and bismuth resinate; and other acidic catalysts and basic catalysts known as the silanol condensation catalyst.

A blending ratio of the curing catalyst (C), which is not particularly limited, is preferably 0.000001 to 10 parts by mass, more preferably 0.00001 to 5 parts by mass with respect to 100 parts by mass of the vinyl-based resin (A). One kind of the curing catalysts may be used alone, or two or more kinds thereof may be used in combination.

The vinyl-based resin (A) and the urethane-based resin (B) exert the following marked effects. Each of the resins is excellent in rapid curability and cures without the use of any tin-based catalyst, and its curing speed is significantly higher than that of a conventional curable composition that requires a tin-based catalyst. The curable composition of the present invention is suitably free of any tin-based catalyst in terms of toxicity. Specifically, the content of tin in the curable composition of the present invention is preferably 100 wtppm or less, more preferably 50 wtppm or less, still more preferably 0 wtppm.

The curable composition of the present invention may be blended with any one of the substances such as a silane coupling agent, a physical property adjustor, a filler, a plasticizer, a reactive diluent, a thixotropic agent, a dehydrating agent (storage stability improver), a tackiness imparting agent, a sagging inhibitor, a UV absorber, an antioxidant, a flame retardant, a colorant, and a radical polymerization initiator, and of the various solvents such as toluene and an alcohol in addition to the components described in the foregoing as required, or may be blended with any other polymer compatible with the curable composition.

Although the silane coupling agent can be selected from a wide variety of known silane coupling agents without any particular limitation, for example, aminosilanes such as aminoethylaminopropyltrimethoxysilane, aminoethylaminopropylmethyldimethoxysilane, and aminoethylaminopropylmethylmethoxysilane, epoxysilanes such as γ-glycidoxypropyltrimethoxysilane, acrylic silanes such as γ-methacryloxypropyltrimethoxysilane, mercaptosilanes such as γ-mercaptopropyltrimethoxysilane, and isocyanatosilanes such as γ-isocyanatopropyltrimethoxysilane. One kind of the silane coupling agents may be used alone, or two or more kinds thereof may be used in combination.

The physical property adjuster is added for the purpose of improving the tensile property. Examples of the physical property adjuster comprise silicon compounds each having one silanol group in one molecule thereof, such as triphenylsilanol, trialkylsilanol, dialkylphenylsilanol, and diphenylalkylsilanol. The examples further comprise various silane coupling agents such as silicon compounds each of which hydrolyzes to produce a compound having one silanol group in one molecule thereof including triphenylmethoxysilane, trialkylmethoxysilane, dialkylphenylmethoxysilane, diphenylalkylmethoxysilane, triphenylethoxysilane, and trialkylethoxysilane. One kind of the physical property adjusters may be used alone, or two or more kinds thereof may be used in combination.

The filler is added for the purpose of reinforcing a cured product. Examples of the filler comprise calcium carbonate, magnesium carbonate, diatomaceous earth hydrous silicic acid, hydrous silicic acid, silicic anhydride, calcium silicate, silica, titanium dioxide, clay, talc, carbon black, a slate powder, mica, kaolin, and zeolite. Of those, calcium carbonate is preferred, and calcium carbonate treated with a fatty acid is more preferred. In addition, a glass bead, a silica bead, an alumina bead, a carbon bead, a styrene bead, a phenol bead, an acrylic bead, porous silica, a Shirasu balloon, a glass balloon, a silica balloon, a saran balloon, an acrylic balloon, or the like can also be used. Of those, an acrylic balloon is more preferred because a reduction in elongation of the composition after the curing of the composition is small. One kind of the above-mentioned fillers may be used alone, or two or more kinds thereof may be used in combination.

The plasticizer is added for the purpose of enhancing elongation physical property after curing or enabling a low modulus. The kind of the plasticizer is not particularly limited, and examples thereof comprise: phthalic acid esters such as dioctyl phthalate, dibutyl phthalate, butylbenzyl phthalate, diisodecyl phthalate, and diisoundecyl phthalate; aliphatic dibasic acid esters such as dioctyl adipate, isodecyl succinate, dioctyl sebacate, and dibutyl adipate; glycol esters such as diethylene glycol dibenzoate, dipropylene glycol dibenzoate, and pentaerythritol ester; aliphatic esters such as butyl oleate and methyl acetylricinoleate; phosphoric acid esters such as tricresyl phosphate, trioctyl phosphate, octyl diphenyl phosphate, tributyl phosphate, and tricresyl phosphate; epoxy plasticizers such as epoxidized soybean oil, epoxidized linseed oil and epoxystearic acid benzyl ester; polyester-based plasticizers such as a polyester of a dibasic acid and a dihydric alcohol; polyethers such as derivatives of polypropylene glycol and polyethyleneglycol; polystyrenes such as poly-α-methylstyrene and polystyrene; hydrocarbon-based oligomers such as polybutadiene, butadiene-acrylonitrile copolymers, polychloroprene, polyisoprene, polybutene, hydrogenated polybutadiene, hydrogenated polyisoprene, and processed oil; chlorinated paraffins; hydrolyzable silyl group-containing polymers such as MS polymer 203H (manufactured by KANEKA CORPORATION), Silyl SAT200 (manufactured by KANEKA CORPORATION), ES-GX2443ST (manufactured by ASAHI GLASS CO., LTD.), and ES-GX3440ST (manufactured by ASAHI GLASS CO., LTD.); acryl plasticizers such as UP-1080 (manufactured by TOAGOSEI Co., Ltd.) and UP-1061 (manufactured by TOAGOSEI Co., Ltd.); hydroxyl group-containing acrylic plasticizers such as UP-2000 (manufactured by TOAGOSEI Co., Ltd.) and UHE-2012 (manufactured by TOAGOSEI Co., Ltd.); carboxyl group-containing acrylic polymers such as UC-3510 (manufactured by TOAGOSEI Co., Ltd.); epoxy group-containing acrylic polymers such as UG-4000 (manufactured by TOAGOSEI Co., Ltd.); and silyl group-containing acrylic polymers such as US-6110 (manufactured by TOAGOSEI Co., Ltd.) and US-6120 (manufactured by TOAGOSEI Co., Ltd.). One kind of those plasticizers may be used alone, or two or more kinds thereof may be used in combination.

Examples of the thixotropic agent comprise: an inorganic thixotropic agent such as colloidal silica or asbestine; an organic thixotropic agent such as organic bentonite, modified polyester polyol, or a fatty acid amide; a hydrogenated castor oil derivative; a fatty acid amide wax; aluminum stearate; and barium stearate. One kind of the thixotropic agents may be used alone, or two or more kinds thereof may be used in combination.

The dehydrating agent is added for the purpose of removing moisture during storage. Examples of the dehydrating agent comprise silane compounds such as vinyltrimethoxysilane, dimethyldimethoxysilane, tetraethoxysilane, methyltrimethoxysilane, and methyltriethoxysilane.

The antioxidant is used to prevent oxidation of the cured sealing material and improve weathering resistance, and examples thereof comprise hindered amine-based and hindered phenol-based antioxidants. Examples of the hindered amine-based antioxidant comprise, but are not limited to, N,N',N'',N'''-tetrakis-(4,6-bis(butyl-(N-methyl-2,2,6,6-tetramethylpiperidin-4-yl) amino)-triazin-2-yl)-4,7-diazadecane-1,10-diamine, a polycondensate of dibutylamine•1,3, 5-triazine•N,N'-bis-(2,2,6,6-tetramethyl-4-piperidyl-1,6-hexame thylenediamine•N-(2,2,6,6-tetramethyl-4-piperidyl) butylamine, poly[{6-(1,1,3,3-tetramethylbutyl) amino-1,3, 5-trizaine-2,4-diyl} {(2,2,6,6-tetramethyl-4-piperidyl) imino} hexamethylene{(2,2,6,6-tetramethyl-4-piperidyl) imino}], a polymer of dimethyl succinate and 4-hydroxy-2, 2,6,6-tetramethyl-1-piperidine ethanol, [decane dicarboxylic acid bis(2,2,6,6-tetramethyl-1(octyloxy)-4-piperidyl) ester, reaction product (70%) of 1,1-dimethylethyl hyperoxide and octane]-polypropylene (30%), bis(1,2,2,6,6-pentamethyl-4-piperidyl) [[3,5-bis(1,1-dimethylethyl)-4-hydroxyphenyl] methyl] butylmalonate, methyl 1,2,2,6,6-pentamethyl-4-piperidyl sebacate, bis(2,2,6,6-tetramethyl-4-piperidyl) sebacate, bis(1,2,2,6,6-pentamethyl-4-piperidyl) sebacate, 1-[2-[3-(3,5-di-tert-butyl-4-hydroxyphenyl) propionyloxy] ethyl]-4-[3-(3,5-di-tert-butyl-4-hydroxyphenyl) propionyloxy]-2,2,6,6-tetramethylpiperidine, 4-benzoyloxy-2,2,6,6-tetramethyl piperidine, and 8-acetyl-3-dodecyl-7,7,9,9-tetramethyl-1,3, 8-triazaspiro[4.5]decane-2,4-dione. Examples of the hindered phenol-based antioxidant comprise, but are not limited to, pentaerythritol-tetrakis[3-(3,5-di-tert-butyl-4-hydroxyphenyl) propionate], thiodiethylene-bis[3-(3,5-di-tert-butyl-4-hydroxyphenyl) priponate], octadecyl-3-(3,5-di-tert-butyl-4-hydroxyphenyl) propionate], N,N'-hexane-1,6-diylbis [3-(3,5-di-tert-butyl-4-hydroxyphenylpropionamide], benzene propanoic acid 3,5-bis(1,1-dimethylethyl)-4-hydroxy C7-C9 side chain alkyl ester, 2,4-dimethyl-6-(1-methylpentadecyl) phenol, diethyl[[3,5-bis(1,1-dimethylethyl)-4-hydroxyphenyl] methyl] phosphonate, 3,3',3'',5,5',5''-hexane-tert-butyl-4-a,a',a''-(mesitylene-2,4,6-tolyl) tri-p-cresol, calcium diethylbis[[[3,5-bis-(1,1-dimethylethyl)-4-hydroxyphenyl] methyl] phosphonate], 4,6-bis (octylthiomethyl)-o-cresol, ethylenebis(oxyethylene) bis[3-(5-tert-butyl-4-hydroxy-m-tolyl) propionate], hexamethylenebis[3-(3,5-di-tert-butyl-4-hydroxyphenyl) propionate], 1,3,5-tris(3,5-di-tert-butyl-4-hydroxybenzyl)-1, 3,5-triazine-2,4,6-(1H,3H,5H)-tri one, a reaction product of N-phenylbenzeneamine and 2,4,4-trimethylpentene, and 2,6-di-tert-butyl-4-(4,6-bis(octylthio)-1,3,5-triazin-2-ylamino) phenol. One kind of the antioxidants may be used alone, or two or more kinds thereof may be used in combination.

The UV absorber is used to prevent light degradation of the cured sealing material and improve weathering resistance. For example, there are given benzotriazole-based, triazine-based, benzophenone-based, and benzoate-based UV absorbers. Examples of the UV absorber comprise, but are not limited to, benzotriazole-based UV absorbers such as 2,4-di-tert-butyl-6-(5-chlorobenzotriazol-2-yl)phenol, 2-(2H-benzotriazol-2-yl)-4,6-di-tert-pentylphenol, 2-(2H-benzotriazol-2-yl)-4-(1,1,3,3-tetramethylbutyl)phenol, a reaction product of methyl 3-(3-(2H-benzotriazol-2-yl)-5-tert-butyl-4-hydroxyphenyl)propionate and polyethylene glycol 300, and 2-(2H-benzotriazol-2-yl)-6-(linear and side chain dodecyl)-4-methyl phenol, triazine-based UV absorbers such as 2-(4,6-diphenyl-1,3,5-triazin-2-yl)-5-[(hexyl)oxy]-phenol, benzophenone-based UV absorbers such as octabenzone, and benzoate-based UV absorbers such as 2,4-di-tert-butylphenyl-3,5-di-tert-butyl-4-hydroxybenzoate. One kind of the UV absorbers may be used alone, or two or more kinds thereof may be used in combination.

The curable composition of the present invention, which may be of a one-component type or a two-component type as required, can be particularly suitably used as a curable composition of a one-component type. The curable composition of the present invention can be used in, for example, an adhesive, a sealing material, a tackiness material, a coating material, a potting material, a paint, a putty material, or a primer. The curable composition of the present invention is particularly preferably used in an adhesive because of its excellent adhesiveness, rubber physical properties, storage stability, depth curability, and rapid curability, but the composition can be used for various architectures, automobiles, civil engineering, an electrical and electronic field, or the like as well.

EXAMPLES

Hereinafter, the present invention is described more specifically by way of examples. Needless to say, however, those examples are exemplarily shown and should not be construed as being limitative.

Analysis and measurement in synthesis examples, examples, and comparative examples were performed in accordance with the following methods.

(1) Measurement of Number Average Molecular Weight

Measurement was performed by gel permeation chromatography (GPC) under the following conditions. In the present invention, a molecular weight of the highest frequency measured under the measurement conditions by GPC and converted in terms of standard polyethylene glycol is referred to as "number average molecular weight."

THF Solvent Measuring Apparatus

Analyzers: An Alliance (manufactured by Waters Corporation), a 2410 model differential refractometer (manufactured by Waters Corporation), a 996 model multi-wavelength detector (manufactured by Waters Corporation), and a Milleniam data processor (manufactured by Waters Corporation)

Column: A Plgel GUARD+5 μm Mixed-C×three pieces (50×7.5 mm, 300×7.5 mm: manufactured by PolymerLab)

Flow rate: 1 mL/min

Converted polymer: Polyethylene glycol

Measurement temperature: 40° C.

(2) Storage Stability Test

A curable composition in a flask was left to stand at room temperature for 3 weeks, and then its viscosity was visually observed by tilting the flask.

(3) Curability Test

Evaluation for curability was performed by measuring a tack-free time (TFT) by JIS A 1439 4.19. The case where a film was formed within 60 seconds was evaluated as o (good) and the case where the formation required more than 60 seconds was evaluated as x (bad).

(4) Transparency (Compatibility)

A curable composition was loaded into a bottle, and then its turbidity was visually observed at room temperature (20 to 25° C.). Evaluation criteria are as described below.

o: Transparent, x: Clouding or two-phase separation.

5. Adhesiveness Tests (5-1) Adhesiveness 0.2 Gram of a curable composition was uniformly applied onto an adherend, and was then immediately stuck thereto so as to have an area measuring 25 mm by 25 mm. After the sticking, the resultant was clamped with a small eye clip under an atmosphere having a temperature of 23° C. and a relative humidity of 50% for 7 days. Immediately after that, measurement was performed in conformity with a method of testing a rigid adherend for its tensile shear strength in JIS K 6850. A polycarbonate or Al was used as the adherend.

(5-2) Rise in Adhesiveness 0.2 Gram of a curable composition was uniformly applied onto lauan plywood (having a thickness of 5 mm, a width of 25 mm, and a length of 100 mm), and was then immediately stuck thereto so as to have an area measuring 25 mm by 25 mm. After the sticking, the resultant was clamped with a small eye clip under an atmosphere having a temperature of 23° C. and a relative humidity of 50% for a predetermined time period shown in Table 12. Immediately after that, measurement was performed in conformity with a method of testing a rigid adherend for its tensile shear strength in JIS K 6850.

Synthesis Example 1

As shown in Table 1, 25.00 g of n-butyl acrylate, 65.92 g of stearyl methacrylate, 2.06 g of acryloxymethyltrimethoxysilane, and 3.37 g of mercaptomethyltrimethoxysilane were loaded into a 300-mL flask mounted with a stirring machine, a temperature gauge, a nitrogen-introducing port, a monomer-loading tube, and a water-cooled condenser, and then the mixture was heated to 80° C. 1.34 Grams of AIBN dissolved in 5 ml of THF were dropped to the flask over 3 hours, and then the whole was subjected to a reaction for an additional six hours at 80° C. Thus, a vinyl-based resin A1 was obtained. The resultant vinyl-based resin A1 had a number average molecular weight of 5,900 and an Mw/Mn of 1.6. The structural unit ratio between the structural unit represented by the general formula (4) and the structural unit represented by the general formula (5) was 40:1.

Synthesis Example 2

As shown in Table 1, 49.50 g of ethyl acetate were loaded into a 300-mL flask mounted with a stirring machine, a temperature gauge, a nitrogen-introducing port, a monomer-loading tube, and a water-cooled condenser, and were then heated to 80° C. 62.40 Grams of methyl methacrylate, 26.70 g of 2-ethylhexyl methacrylate, 16.5 g of acryloxymethyltrimethoxysilane, 7.60 g of mercaptopropyltrimethoxysilane, and 2.60 g of AIBN were mixed in another container. The mixture was dropped to the flask over 3 hours, and then the whole was subjected to a reaction for an additional six hours at 80° C. Thus, a vinyl-based resin A2 was obtained. The resultant vinyl-based resin A2 had a number average molecular weight of 5,000 and an Mw/Mn of 1.6. The structural unit ratio between the structural unit represented by the general formula (4) and the structural unit represented by the general formula (5) was 100:1.

Synthesis Example 3

As shown in Table 1, 59.50 g of ethyl acetate were loaded into a 300-mL flask mounted with a stirring machine, a temperature gauge, a nitrogen-introducing port, a monomer-loading tube, and a water-cooled condenser, and were then heated to 80° C. 62.40 Grams of methyl methacrylate, 45.58 g of stearyl methacrylate, 20.5 g of methacryloxymethyltrimethoxysilane, 7.60 g of mercaptopropyltrimethoxysilane, and 2.60 g of AIBN were mixed in another container. The mixture was dropped to the flask over 3 hours, and then the whole was subjected to a reaction for an additional six hours at 80° C. Thus, a vinyl-based resin A3 was obtained. The resultant vinyl-based resin A3 had a number average molecular weight of 5,000 and an Mw/Mn of 1.6. The structural unit ratio between the structural unit represented by the general formula (4) and the structural unit represented by the general formula (5) was 100:1.

Synthesis Example 4

As shown in Table 1, 43.00 g of ethyl acetate were loaded into a 300-mL flask mounted with a stirring machine, a temperature gauge, a nitrogen-introducing port, a monomer-loading tube, and a water-cooled condenser, and were then heated to 80° C. 65.20 Grams of methyl methacrylate, 5.95 g of n-butyl acrylate, 12.69 g of stearyl methacrylate, 6.15 g of acryloxymethyltrimethoxysilane, 1.00 g of methacryloxymethyltrimethoxysilane, 7.03 g of mercaptopropyltrimethoxysilane, and 2.60 g of AIBN were mixed in another container. The mixture was dropped to the flask over 3 hours, and then the whole was subjected to a reaction for an additional six hours at 80° C. Thus, a vinyl-based resin A4 was obtained. The resultant vinyl-based resin A4 had a number average molecular weight of 5,000 and an Mw/Mn of 1.6. The structural unit ratio between the structural unit represented by the general formula (4) and the structural unit represented by the general formula (5) was 24:1.

Synthesis Example 5

As shown in Table 2, 43.00 g of xylene, 80.00 g of methyl methacrylate, 20.00 g of stearyl methacrylate, 20.00 g of methacryloxymethyltrimethoxysilane, and 0.10 g of ruthenocene dichloride as a metal catalyst were loaded into a flask provided with a stirring device, a nitrogen gas-introducing tube, a temperature gauge, and a reflux condenser, and then the contents in the flask were heated to 80° C. while a nitrogen gas was introduced into the flask. Next, 20.00 g of 3-mercaptopropyltrimethoxysilane were added in one stroke into the flask whose inside had been sufficiently replaced with the nitrogen gas while the contents were stirred. After the addition of 20.00 g of 3-mercaptopropyltrimethoxysilane, heating and cooling were performed for 4 hours so that the temperature of the contents in the flask during the stirring was able to be kept at 80° C. Further, 20.00 g of 3-mercaptopropyltrimethoxysilane were additionally added over 5 minutes into the flask whose inside had been sufficiently replaced with the nitrogen gas while the contents were stirred. After the additional addition of a total of 20.00 g of 3-mercaptopropyltrimethoxysilane, a reaction was performed for 4 hours while cooling and heating were further performed so that the temperature of the contents in the flask during the stirring was able to be kept at 90° C. After the reaction for a total of 8 hours and 5 minutes, the temperature of the reaction product was returned to room temperature, and then 20.00 g of a benzoquinone solution (95% THF solution) were added to the reaction product to terminate polymerization. Thus, a vinyl-based resin A5 was obtained. The resultant vinyl-based resin A5 had a number average molecular weight of 5,000 and an Mw/Mn of 1.6. The structural unit ratio between the structural unit represented by the general formula (4) and the structural unit represented by the general formula (5) was 10:1.

Synthesis Example 6

As shown in Table 2, 43.00 g of xylene, 80.00 g of methyl methacrylate, 20.00 g of 2-ethylhexyl methacrylate, 20.00 g of acryloxymethyltrimethoxysilane, and 0.10 g of zirconocene dichloride as a metal catalyst were loaded into a flask provided with a stirring device, a nitrogen gas-introducing tube, a temperature gauge, and a reflux condenser, and then the contents in the flask were heated to 80° C. while a nitrogen gas was introduced into the flask. Next, 20.00 g of mercaptomethyltrimethoxysilane were added in one stroke into the flask whose inside had been sufficiently replaced with the nitrogen gas while the contents were stirred. After the addition of 20.00 g of mercaptomethyltrimethoxysilane, heating and cooling were performed for 4 hours so that the temperature of the contents in the flask during the stirring was able to be kept at 80° C. Further, 20.00 g of mercaptomethyltrimethoxysilane were additionally added over 5 minutes into the flask whose inside had been sufficiently replaced with the nitrogen gas while the contents were stirred. After the additional addition of a total of 20.00 g of mercaptomethyltrimethoxysilane, a reaction was performed for 4 hours while cooling and heating were further performed so that the temperature of the contents in the flask during the stirring was able to be kept at 90° C. After the reaction for a total of 8 hours and 5 minutes, the temperature of the reaction product was returned to room temperature, and then 20.00 g of a benzoquinone solution (95% THF solution) were added to the reaction product to terminate polymerization. Thus, a vinyl-based resin A6 was obtained. The resultant vinyl-based resin A6 had a number average molecular weight of 5,000 and an Mw/Mn of 1.6. The structural unit ratio between the structural unit represented by the general formula (4) and the structural unit represented by the general formula (5) was 10:1.

Synthesis Example 7

As shown in Table 2, 10.00 g of propylene carbonate, 54.69 g of methyl methacrylate, 13.67 g of lauryl methacrylate, 2.20 g of methacryloxymethyltrimethoxysilane, 2.06 g of acryloxymethyltrimethoxysilane, 1.80 g of methyl 2-bromoisopropionate, 1.43 g of CuBr as a transition metal catalyst, and 3.47 g of N,N,N',N'',N''-pentamethylenediethylenetriamine as a ligand were loaded into a flask provided with a stirring device, a nitrogen gas-introducing tube, a temperature gauge, and a reflux condenser, and then the contents in the flask were heated to 80° C. while a nitrogen gas was introduced into the flask. After a reaction for 12 hours, the temperature of the reaction product was returned to room temperature, and then 20.00 g of a benzoquinone solution (95% THF solution) were added to the reaction product to terminate polymerization. The reaction product was subjected to precipitation purification with dehydrated methanol (manufactured by Tokyo Chemical Industry Co., Ltd.). Thus, a vinyl-based resin A7 was obtained. The resultant vinyl-based resin A7 had a number average molecular weight of 8,500 and an Mw/Mn of 1.1. The structural unit ratio between the structural unit represented by the general formula (4) and the structural unit represented by the general formula (5) was 10:1.

Synthesis Example 8

As shown in Table 2, 10.00 g of toluene, 27.35 g of methyl methacrylate, 6.84 g of lauryl methacrylate, 4.41 g of methacryloxymethyltrimethoxysilane, 2.30 g of synthesized 1-phenylethyl dithiobenzoate, and 0.82 g of AIBN were loaded into a flask provided with a stirring device, a nitrogen gas-introducing tube, a temperature gauge, and a reflux condenser, and then the contents in the flask were heated to 80° C. while a nitrogen gas was introduced into the flask. Heating and cooling were performed for 8 hours so that the temperature of the contents in the flask during their stirring was able to be kept at 80° C. After a reaction, the temperature of the reaction product was returned to room temperature, and then 20.00 g of a benzoquinone solution (95% THF solution) were added to the reaction product to terminate polymerization. Thus, a vinyl-based resin A8 was obtained. The resultant vinyl-based resin A8 had a number average molecular weight of 4,300 and an Mw/Mn of 1.1. The structural unit ratio between the structural unit represented by the general formula (4) and the structural unit represented by the general formula (5) was 24:1.

Synthesis Example 9

As shown in Table 2, 20.00 g of toluene, 18.23 g of methyl methacrylate, 4.55 g of lauryl methacrylate, 8.81 g of methacryloxymethyltrimethoxysilane, 4.60 g of synthesized 1-phenylethyl dithiobenzoate, and 1.64 g of AIBN were loaded into a flask provided with a stirring device, a nitrogen gas-introducing tube, a temperature gauge, and a reflux condenser, and then the contents in the flask were heated to 80° C. while a nitrogen gas was introduced into the flask. Heating and cooling were performed for 8 hours so that the temperature of the contents in the flask during their stirring was able to be kept at 80° C. After a reaction, the temperature of the reaction product was returned to room temperature, and then 20.00 g of a benzoquinone solution (95% THF solution) were added to the reaction product to terminate polymerization. Thus, a vinyl-based resin A9 was obtained. The resultant vinyl-based resin A9 had a number average molecular weight of 1,700 and an Mw/Mn of 1.2. The structural unit ratio between the structural unit represented by the general formula (4) and the structural unit represented by the general formula (5) was 24:1.

Synthesis Example 10

As shown in Table 3, 100.00 g of a polyoxypropylene diol having a number average molecular weight of 10,000 (trade name: PREMINOL 4010, manufactured by ASAHI GLASS CO., LTD.) and 3.49 g of 2,4-tolylene diisocyanate were caused to react with each other in a flask provided with a stirring device, a nitrogen gas-introducing tube, a temperature gauge, and a reflux condenser under a nitrogen atmosphere at 90° C. for 3 hours while being stirred and mixed. Thus, a urethane prepolymer 1 was obtained.

A new flask provided with a stirring device, a nitrogen gas-introducing tube, a temperature gauge, and a reflux condenser was deaerated under reduced pressure, and was then replaced with a nitrogen gas. In a stream of nitrogen, 1.54 g of n-butylamine were added to the flask. Subsequently, 4.04 g of acryloxymethyltrimethoxysilane were added to the flask, and then the mixture was stirred at room temperature for 24 hours. Thus, a reaction product X1 was obtained. The resultant reaction product X1 was caused to react with the urethane prepolymer 1 obtained in the foregoing at room temperature for 1 hour. After that, the temperature of the resultant was increased to 60° C., and then the resultant was stirred for 2 hours. Thus, a urethane-based resin B1 was obtained. The resultant urethane-based resin B1 had a number average molecular weight of 11,000.

Synthesis Example 11

Propylene oxide was subjected to a reaction in a flask provided with a stirring device, a nitrogen gas-introducing tube, a temperature gauge, and a reflux condenser with propylene glycol as an initiator in the presence of a zinc hexacyanocobaltate-glyme complex catalyst. Thus, a polyoxypropylene diol having a number average molecular weight of 15,000 and an Mw/Mn of 1.3 was obtained.

As shown in Table 3, 100 g of the polyoxypropylene diol obtained in the foregoing and 2.32 g of 2,4-tolylene diisocyanate were caused to react with each other under a nitrogen atmosphere at 90° C. for 3 hours while being stirred and mixed. Thus, a urethane prepolymer 2 was obtained.

A flask provided with a stirring device, a nitrogen gas-introducing tube, a temperature gauge, and a reflux condenser was deaerated under reduced pressure, and was then replaced with a nitrogen gas. In a stream of nitrogen, 1.02 g of n-butylamine were added to the flask. Subsequently, 2.89 g of methacryloxymethyltrimethoxysilane were added to the flask, and then the mixture was stirred at room temperature for 24 hours. Thus, a reaction product X2 was obtained. The resultant reaction product X2 was caused to react with the urethane prepolymer 2 obtained in the foregoing at room temperature for 1 hour. After that, the temperature of the resultant was increased to 60° C., and then the resultant was stirred for 2 hours. Thus, a urethane-based resin B2 was obtained. The resultant urethane-based resin B2 had a number average molecular weight of 16,000.

Synthesis Example 12

As shown in Table 3, in a stream of nitrogen, 13.91 g of n-octylamine were added to a flask provided with a stirring device, a nitrogen gas-introducing tube, a temperature gauge, and a reflux condenser. Subsequently, 22.20 g of methacryloxymethyltrimethoxysilane were added to the flask, and then the mixture was stirred at room temperature for 24 hours. Subsequently, in a stream of nitrogen, 22.78 g of isophorone diisocyanate were dropped to the flask at room temperature over 1 hour, and then the whole was subjected to a reaction at 50° C. for 1 hour. Thus, a reaction product Y1 was obtained. After the completion of the reaction, 100.00 g of a Diol 2000 (manufactured by MITSUI CHEMICALS POLYURETHANES, INC.) were added to the flask, and then the mixture was subjected to a reaction at 80° C. for 6 hours. Thus, a urethane-based resin B3 was obtained. The resultant urethane-based resin B3 had a number average molecular weight of 2,800.

Synthesis Example 13

As shown in Table 4, 40.00 g of the urethane-based resin B1 obtained in Synthesis Example 10 were loaded into a 300-mL flask mounted with a stirring machine, a temperature gauge, a nitrogen-introducing port, a monomer-loading tube, and a water-cooled condenser, and were then heated to 80° C. 62.40 Grams of methyl methacrylate, 26.70 g of 2-ethylhexyl methacrylate, 30.00 g of acryloxymethyltrimethoxysilane, 13.00 g of mercaptopropyltrimethoxysilane, and 5.00 g of AIBN were mixed in another container. The mixture was dropped to the urethane-based resin B1 heated in the foregoing over 3 hours, and then the whole was subjected to a reaction for an additional six hours at 80° C. so that a vinyl-based resin A10 was synthesized in the urethane-based resin B1. Thus, a resin composition containing the vinyl-based resin A10 and the urethane-based resin B1 (A10+B1) was obtained. The resultant vinyl-based resin A10 had a number average molecular weight of 5,000 and an Mw/Mn of 1.6. A blending ratio "vinyl-based resin A10: urethane-based resin B1" between the vinyl-based resin A10 and the urethane-based resin B1 was 70:30 in terms of a mass ratio.

Synthesis Example 14

As shown in Table 4, 90 g of the urethane-based resin B2 obtained in Synthesis Example 11 were loaded into a 300-mL flask mounted with a stirring machine, a temperature gauge, a nitrogen-introducing port, a monomer-loading tube, and a water-cooled condenser, and were then heated to 80° C. 6.52 Grams of methyl methacrylate, 0.60 g of n-butyl acrylate, 0.97 g of lauryl methacrylate, 0.66 g of methacryloxymethyltrimethoxysilane, 0.65 g of mercaptomethyltrimethoxysilane, and 0.28 g of BPO were mixed in another container. The mixture was dropped to the urethane-based resin B2 heated in the foregoing over 3 hours, and then the whole was subjected to a reaction for an additional six hours at 80° C. so that a vinyl-based resin A11 was synthesized in the urethane-based resin B2. Thus, a resin composition containing the vinyl-based resin A11 and the urethane-based resin B2 (A11+B2) was obtained. The resultant vinyl-based resin A11 had a number average molecular weight of 5,000 and an Mw/Mn of 1.6. A blending ratio "vinyl-based resin A11: urethane-based resin B2" between the vinyl-based resin A11 and the urethane-based resin B2 was 10:90 in terms of a mass ratio.

Comparative Synthesis Example 1

As shown in Table 5, 40 g of ethyl acetate were loaded into a 300-mL flask mounted with a stirring machine, a temperature gauge, a nitrogen-introducing port, a monomer-loading tube, and a water-cooled condenser, and were then heated to 80° C. 62.4 Grams of methyl methacrylate, 45.58 g of stearyl methacrylate, 1.99 g of methacryloxypropyltrimethoxysilane, 7.60 g of mercaptopropyltrimethoxysilane, and 2.60 g of AIBN were mixed in another container. The mixture was dropped to the flask over 3 hours, and then the whole was subjected to a reaction for an additional six hours at 80° C. Thus, a vinyl-based resin X was obtained. The resultant vinyl-based resin X had a number average molecular weight of 5,000 and an Mw/Mn of 1.6.

TABLE 1

|  | Synthesis Example 1 | Synthesis Example 2 | Synthesis Example 3 | Synthesis Example 4 |
|---|---|---|---|---|
| Synthesized vinyl-based resin | A1 | A2 | A3 | A4 |
| n-Butyl acrylate | 25.00 | — | — | 5.95 |
| Stearyl methacrylate | 65.92 | — | 45.58 | 12.69 |
| Methyl methacrylate | — | 62.40 | 62.40 | 65.20 |
| 2-Ethylhexyl methacrylate | — | 26.70 | — | — |
| Acryloxymethyltrimethoxysilane | 2.06 | 16.5 | — | 6.15 |
| Methacryloxymethyltrimethoxysilane | — | — | 20.5 | 1.00 |
| Mercaptomethyltrimethoxysilane | 3.37 | — | — | — |
| Mercaptopropyltrimethoxysilane | — | 7.60 | 7.60 | 7.03 |
| AIBN | 1.34 | 2.60 | 2.60 | 2.60 |
| THF | 5 mL | — | — | — |
| Ethyl acetate | — | 49.50 | 59.50 | 43.00 |

TABLE 2

|  | Synthesis Example 5 | Synthesis Example 6 | Synthesis Example 7 | Synthesis Example 8 | Synthesis Example 9 |
|---|---|---|---|---|---|
| Synthesized vinyl-based resin | A5 | A6 | A7 | A8 | A9 |
| Stearyl methacrylate | 20.00 | — | — | — | — |
| Methyl methacrylate | 80.00 | 80.00 | 54.69 | 27.35 | 18.23 |
| 2-Ethylhexyl methacrylate | — | 20.00 | — | — | — |
| Lauryl methacrylate | — | — | 13.67 | 6.84 | 4.55 |
| Acryloxymethyltrimethoxysilane | — | 20.00 | 2.06 | — | — |
| Methacryloxymethyltrimethoxysilane | 20.00 | — | 2.20 | 4.41 | 8.81 |
| Mercaptomethyltrimethoxysilane | — | 40.00 | — | — | — |
| Mercaptopropyltrimethoxysilane | 40.00 | — | — | — | — |
| 1-Phenylethyl dithiobenzoate | — | — | — | 2.30 | 4.60 |
| AIBN | — | — | — | 0.82 | 1.64 |
| Methyl 2-bromoisopropionate | — | — | 1.80 | — | — |
| Ruthenocene dichloride | 0.10 | — | — | — | — |
| Zirconocene dichloride | — | 0.10 | — | — | — |
| CuBr | — | — | 1.43 | — | — |
| N,N,N',N'',N''-Pentamethylenediethylenetriamine | — | — | 3.47 | — | — |
| Xylene | 43.00 | 43.00 | — | — | — |
| Propylene carbonate | — | — | 10.00 | — | — |
| Toluene | — | — | — | 10.00 | 20.00 |
| Benzoquinone solution | 20.00 | 20.00 | 20.00 | 20.00 | 20.00 |

TABLE 3

|  | Synthesis Example 10 | Synthesis Example 11 | Synthesis Example 12 |
|---|---|---|---|
| Synthesized urethane-based resin | B1 | B2 | B3 |
| PREMINOL 4010 | 100.00 | — | — |
| Polyoxypropylene diol | — | 100.00 | — |
| Diol2000 | — | — | 100.00 |
| 2,4-Tolylene diisocyanate | 3.49 | 2.32 | — |
| Isophorone diisocyanate | — | — | 22.78 |
| n-Butylamine | 1.54 | 1.02 | — |
| n-Octylamine | — | — | 13.91 |
| Acryloxymethyltrimethoxysilane | 4.04 | — | — |
| Methacryloxymethyltrimethoxysilane | — | 2.89 | 22.20 |

TABLE 4

|  | Synthesis Example 13 | Synthesis Example 14 |
|---|---|---|
| n-Butyl acrylate | — | 0.60 |
| Methyl methacrylate | 62.40 | 6.52 |
| 2-Ethylhexyl methacrylate | 26.70 | — |
| Lauryl methacrylate | — | 0.97 |
| Acryloxymethyltrimethoxysilane | 30.00 | — |
| Methacryloxymethyltrimethoxysilane | — | 0.66 |
| Mercaptomethyltrimethoxysilane | — | 0.65 |
| Mercaptopropyltrimethoxysilane | 13.00 | — |
| AIBN | 5.00 | — |
| BPO | — | 0.28 |
| Urethane-based resin B1 | 40.00 | — |
| Urethane-based resin B2 | — | 90.00 |

TABLE 5

|  | Comparative Synthesis Example 1 |
|---|---|
| Synthesized vinyl-based resin | X |
| Stearyl methacrylate | 45.58 |
| Methyl methacrylate | 62.40 |
| Mercaptopropyltrimethoxysilane | 7.60 |
| Methacryloxypropyltrimethoxysilane | 1.99 |
| AIBN | 2.60 |
| Ethyl acetate | 40.00 |

In Tables 1 to 5, the loadings of the respective blended substances except THF are each represented in a gram unit, and details about the respective compounds are as described below.

n-Butyl acrylate (manufactured by TOKYO CHEMICAL INDUSTRY CO., LTD.)

Stearyl methacrylate (trade name: LIGHT-ESTER S, manufactured by Kyoeisha Chemical Co., Ltd.)

Methyl methacrylate (trade name: LIGHT-ESTER M, manufactured by Kyoeisha Chemical Co., Ltd.)

2-Ethylhexyl methacrylate (trade name: LIGHT-ESTER EH, manufactured by Kyoeisha Chemical Co., Ltd.)

Lauryl methacrylate (trade name: LIGHT-ESTER L, manufactured by Kyoeisha Chemical Co., Ltd.)

Acryloxymethyltrimethoxysilane (manufactured by Gelest, Inc.)

Methacryloxymethyltrimethoxysilane (manufactured by Gelest, Inc.)

Mercaptomethyltrimethoxysilane (trade name: LS535, manufactured by Shin-Etsu Chemical Co., Ltd.)

Mercaptopropyltrimethoxysilane (trade name: KBM803, manufactured by Shin-Etsu Chemical Co., Ltd.)

AIBN: 2,2'-azobisisobutyronitrile (V-60, manufactured by Wako Pure Chemical Industries, Ltd.)

BPO: benzoyl peroxide (NYPER BW, manufactured by NOF CORPORATION)

THF (tetrahydrofuran, manufactured by Wako Pure Chemical Industries, Ltd.)

Ethyl acetate (manufactured by Wako Pure Chemical Industries, Ltd.)

2,4-Tolylene diisocyanate (manufactured by TOKYO CHEMICAL INDUSTRY CO., LTD.)

Diol 2000: polyoxypropylene diol having number average molecular weight of 2,000, manufactured by MITSUI CHEMICALS POLYURETHANES, INC.

PREMINOL 4010: polyoxypropylene diol having number average molecular weight of 10,000, manufactured by ASAHI GLASS CO., LTD.

Methacryloxypropyltrimethoxysilane (trade name: KBM503, manufactured by Shin-Etsu Chemical Co., Ltd.)

Example 1

As shown in Table 6, 10 parts by mass of the urethane-based resin B1 obtained in Synthesis Example 10 and 90 parts by mass of the vinyl-based resin A1 obtained in Synthesis Example 1 were loaded into a 300-mL flask mounted with a stirring machine, a temperature gauge, a nitrogen-introducing port, a monomer-loading tube, and a water-cooled condenser, and then the mixture was heated to 50° C., followed by deaeration stirring. The temperature of the resultant was returned to room temperature, and then 3.00 parts by mass of 3-aminopropyltrimethoxysilane (trade name: KBM903, manufactured by Shin-Etsu Chemical Co., Ltd.) were added to the resultant. Thus, a curable composition was obtained. Table 11 shows the results of the transparency, storage stability, and curability (TFT) of the curable composition.

Example 2

As shown in Table 6, 50 parts by mass of the urethane-based resin B1 obtained in Synthesis Example 10 and 70 parts by mass of the vinyl-based resin A2 obtained in Synthesis Example 2 were loaded into a 300-mL flask mounted with a stirring machine, a temperature gauge, a nitrogen-introducing port, a monomer-loading tube, and a water-cooled condenser, and then the mixture was heated to 50° C., followed by deaeration stirring. The temperature of the resultant was returned to room temperature, and then 1.00 part by mass of N-aminoethyl-3-aminopropyltrimethoxysilane (trade name: KBM603, manufactured by Shin-Etsu Chemical Co., Ltd.) was added to the resultant. Thus, a curable composition was obtained. Table 11 shows the results of the transparency, storage stability, and curability (TFT) of the curable composition.

Example 3

As shown in Table 6, 70 parts by mass of the urethane-based resin B1 obtained in Synthesis Example 10 and 42 parts by mass of the vinyl-based resin A3 obtained in Synthesis Example 3 were loaded into a 300-mL flask mounted with a stirring machine, a temperature gauge, a nitrogen-introducing port, a monomer-loading tube, and a water-cooled condenser, and then the mixture was heated to 50° C., followed by deaeration stirring. The temperature of the resultant was returned to room temperature, and then 1.00 part by mass of N-aminoethyl-3-aminopropyltrimethoxysilane (trade name: KBM603, manufactured by Shin-Etsu Chemical Co., Ltd.) was added to the resultant. Thus, a curable composition was obtained. Table 11 shows the results of the transparency, storage stability, and curability (TFT) of the curable composition. In addition, Table 12 shows the results of the adhesiveness tests of the curable composition.

Example 4

As shown in Table 6, 70 parts by mass of the urethane-based resin B1 obtained in Synthesis Example 10 and 42 parts by mass of the vinyl-based resin A5 obtained in Synthesis Example 5 were loaded into a 300-mL flask mounted with a stirring machine, a temperature gauge, a nitrogen-introducing port, a monomer-loading tube, and a water-cooled condenser, and then the mixture was heated to 50° C., followed by deaeration stirring. The temperature of the resultant was returned to room temperature, and then 1.00 part by mass of 3-aminopropyltrimethoxysilane (trade name: KBM903, manufactured by Shin-Etsu Chemical Co., Ltd.) was added to the resultant. Thus, a curable composition was obtained. Table 11 shows the results of the transparency, storage stability, and curability (TFT) of the curable composition.

Example 5

As shown in Table 6, 70 parts by mass of the urethane-based resin B1 obtained in Synthesis Example 10 and 42 parts by mass of the vinyl-based resin A6 obtained in Synthesis Example 6 were loaded into a 300-mL flask mounted with a stirring machine, a temperature gauge, a nitrogen-introducing port, a monomer-loading tube, and a water-cooled condenser, and then the mixture was heated to 50° C., followed by deaeration stirring. The temperature of the resultant was returned to room temperature, and then 1.00 part by mass of 3-aminopropyltrimethoxysilane (trade name: KBM903, manufactured by Shin-Etsu Chemical Co., Ltd.) was added to the resultant. Thus, a curable composition was obtained. Table 11 shows the results of the transparency, storage stability, and curability (TFT) of the curable composition.

Example 6

As shown in Table 7, 60 parts by mass of the urethane-based resin B1 obtained in Synthesis Example 10 and 56.1 parts by mass of the vinyl-based resin A4 obtained in Synthesis Example 4 were loaded into a 300-mL flask mounted with a stirring machine, a temperature gauge, a nitrogen-introducing port, a monomer-loading tube, and a water-cooled condenser, and then the mixture was heated to 50° C., followed by deaeration stirring. The temperature of the resultant was returned to room temperature, and then 5.00 parts by mass of 3-aminopropyltrimethoxysilane (trade name: KBM903, manufactured by Shin-Etsu Chemical Co., Ltd.) were added to the resultant. Thus, a curable composition was obtained. Table 11 shows the results of the transparency, storage stability, and curability (TFT) of the curable composition. In addition, Table 12 shows the results of the adhesiveness tests of the curable composition.

Example 7

As shown in Table 7, 60 parts by mass of the urethane-based resin B1 obtained in Synthesis Example 10 and 40 parts by mass of the vinyl-based resin A7 obtained in Synthesis Example 7 were loaded into a 300-mL flask mounted with a stirring machine, a temperature gauge, a nitrogen-introducing port, a monomer-loading tube, and a water-cooled condenser, and then the mixture was heated to 50° C., followed by deaeration stirring. The temperature of the resultant was returned to room temperature, and then 0.50 part by mass of 3-aminopropyltrimethoxysilane (trade name: KBM903, manufactured by Shin-Etsu Chemical Co., Ltd.) was added to the resultant. Thus, a curable composition was obtained. Table 11 shows the results of the transparency, storage stability, and curability (TFT) of the curable composition.

Example 8

As shown in Table 7, 80 parts by mass of the urethane-based resin B1 obtained in Synthesis Example 10 and 20 parts by mass of the vinyl-based resin A8 obtained in Synthesis Example 8 were loaded into a 300-mL flask mounted with a stirring machine, a temperature gauge, a nitrogen-introducing port, a monomer-loading tube, and a water-cooled condenser, and then the mixture was heated to 50° C., followed by deaeration stirring. The temperature of the resultant was returned to room temperature, and then 3.00 parts by mass of 3-aminopropyltrimethoxysilane (trade name: KBM903, manufactured by Shin-Etsu Chemical Co., Ltd.) were added to the resultant. Thus, a curable composition was obtained. Table 11 shows the results of the transparency, storage stability, and curability (TFT) of the curable composition.

Example 9

As shown in Table 7, 80 parts by mass of the urethane-based resin B1 obtained in Synthesis Example 10 and 20 parts by mass of the vinyl-based resin A9 obtained in Synthesis Example 9 were loaded into a 300-mL flask mounted with a stirring machine, a temperature gauge, a nitrogen-introducing port, a monomer-loading tube, and a water-cooled condenser, and then the mixture was heated to 50° C., followed by deaeration stirring. The temperature of the resultant was returned to room temperature, and then 0.10 part by mass of 3-aminopropyltrimethoxysilane (trade name: KBM903, manufactured by Shin-Etsu Chemical Co., Ltd.) was added to the resultant. Thus, a curable composition was obtained. Table 11 shows the results of the transparency, storage stability, and curability (TFT) of the curable composition.

Example 10

As shown in Table 7, 30 parts by mass of the urethane-based resin B3 obtained in Synthesis Example 12 and 70 parts by mass of the vinyl-based resin A1 obtained in Synthesis Example 1 were loaded into a 300-mL flask mounted with a stirring machine, a temperature gauge, a nitrogen-introducing port, a monomer-loading tube, and a water-cooled condenser, and then the mixture was heated to 50° C., followed by deaeration stirring. The temperature of the resultant was returned to room temperature, and then 0.10 part by mass of 3-aminopropyltrimethoxysilane (trade name: KBM903, manufactured by Shin-Etsu Chemical Co., Ltd.) was added to the resultant. Thus, a curable composition was obtained. Table 11 shows the results of the transparency, storage stability, and curability (TFT) of the curable composition.

Example 11

As shown in Table 8, 100 parts by mass of the resin composition (A10+B1) obtained in Synthesis Example 13 were loaded into a 300-mL flask mounted with a stirring machine, a temperature gauge, a nitrogen-introducing port, a monomer-loading tube, and a water-cooled condenser, and then 1.00 part by mass of N-aminoethyl-3-aminopropyltrimethoxysilane (trade name: KBM603, manufactured by Shin-Etsu Chemical Co., Ltd.) was added to the flask. Thus, a curable composition was obtained. Table 11 shows the results of the transparency, storage stability, and curability (TFT) of the curable composition.

Example 12

As shown in Table 8, 100 parts by mass of the resin composition (A11+B2) obtained in Synthesis Example 14 were loaded into a 300-mL flask mounted with a stirring machine, a temperature gauge, a nitrogen-introducing port, a monomer-loading tube, and a water-cooled condenser, and then 1.00 part by mass of N-aminoethyl-3-aminopropyltrimethoxysilane (trade name: KBM603, manufactured by Shin-Etsu Chemical Co., Ltd.) was added to the flask. Thus, a curable composition was obtained. Table 11 shows the results of the transparency, storage stability, and curability (TFT) of the curable composition. In addition, Table 12 shows the results of the adhesiveness tests of the curable composition.

Example 13

As shown in Table 9, 100 parts by mass of the resin composition (A11+B2) obtained in Synthesis Example 14 were loaded into a 300-mL flask mounted with a stirring machine, a temperature gauge, a nitrogen-introducing port, a monomer-loading tube, and a water-cooled condenser, and then 4.00 parts by mass of titanium diisopropoxybis(ethylacetoacetate) (trade name: ORGATIX (registered trademark) TC-750, manufactured by Matsumoto Fine Chemical Co., Ltd.) were added to the flask. Thus, a curable composition was obtained. Table 11 shows the results of the transparency, storage stability, and curability (TFT) of the curable composition.

Example 14

As shown in Table 9, 70 parts by mass of the urethane-based resin B1 obtained in Synthesis Example 10 and 42 parts by mass of the vinyl-based resin A3 obtained in Synthesis Example 3 were loaded into a 300-mL flask mounted with a stirring machine, a temperature gauge, a nitrogen-introducing port, a monomer-loading tube, and a water-cooled condenser, and then the mixture was heated to 50° C., followed by deaeration stirring. The temperature of the resultant was returned to room temperature, and then 4.00 parts by mass of titanium diisopropoxybis(ethylacetoacetate) (trade name: ORGATIX (registered trademark) TC-750, manufactured by Matsumoto Fine Chemical Co., Ltd.) and 1.00 part by mass of glycidylpropyltrimethoxysilane (trade name: KBM403, manufactured by Shin-Etsu Chemical Co., Ltd.) were added to the flask. Thus, a curable composition was obtained. Table 11 shows the results of the transparency, storage stability, and curability (TFT) of the curable composition. In addition, Table 12 shows the results of the adhesiveness tests of the curable composition.

Comparative Example 1

As shown in Table 10, 100 parts by mass of a Psyril SAT-200 (crosslinkable silyl group-containing polyoxyalkylene-based polymer, crosslinkable silyl group: methyldimethoxysilyl group, manufactured by Kaneka Corporation) were loaded into a 300-mL flask mounted with a stirring machine, a temperature gauge, a nitrogen-introducing port, a monomer-loading tube, and a water-cooled condenser, and were then heated to 50° C., followed by deaeration stirring. The temperature of the resultant was returned to room temperature, and then 1.00 part by mass of 3-aminopropyltrimethoxysilane (trade name: KBM903, manufactured by Shin-Etsu Chemical Co., Ltd.) was added to the resultant. Thus, a curable composition was obtained. Table 11 shows the results of the transparency, storage stability, and curability (TFT) of the curable composition. In addition, Table 12 shows the results of the adhesiveness tests of the curable composition.

Comparative Example 2

As shown in Table 10, 60 parts by mass of an ES-GX3440ST (crosslinkable silyl group-containing polyoxyalkylene-based polymer, crosslinkable silyl group: trimethoxysilyl group, manufactured by ASAHI GLASS CO., LTD.) were loaded as a crosslinkable silyl group-containing organic polymer into a 300-mL flask mounted with a stirring machine, a temperature gauge, a nitrogen-introducing port, a monomer-loading tube, and a water-cooled condenser, and then 40 parts by mass of the vinyl-based resin X obtained in Comparative Synthesis Example 1 were added to the flask. The mixture was heated to 50° C., followed by deaeration stirring. The temperature of the resultant was returned to room temperature, and then 1.00 part by mass of 3-aminopropyltrimethoxysilane (trade name: KBM903, manufactured by Shin-Etsu Chemical Co., Ltd.) and 0.3 part by mass of dibutyltin laurate (manufactured by Tokyo Chemical Industry Co., Ltd.) were added to the resultant. Thus, a curable composition was obtained. Table 11 shows the results of the transparency, storage stability, and curability (TFT) of the curable composition. In addition, Table 12 shows the results of the adhesiveness tests of the curable composition.

TABLE 6

|  | Example 1 | Example 2 | Example 3 | Example 4 | Example 5 |
|---|---|---|---|---|---|
| Vinyl-based resin A1 | 90 | — | — | — | — |
| Vinyl-based resin A2 | — | 70 | — | — | — |
| Vinyl-based resin A3 | — | — | 42 | — | — |
| Vinyl-based resin A5 | — | — | — | 42 | — |
| Vinyl-based resin A6 | — | — | — | — | 42 |
| Urethane-based resin B1 | 10 | 50 | 70 | 70 | 70 |
| KBM903 | 3 | — | — | 1 | 1 |
| KBM603 | — | 1 | 1 | — | — |
| (A):(B) | 90:10 | 50:50 | 30:70 | 30:70 | 30:70 |

TABLE 7

|  | Example 6 | Example 7 | Example 8 | Example 9 | Example 10 |
|---|---|---|---|---|---|
| Vinyl-based resin A1 | — | — | — | — | 70 |
| Vinyl-based resin A4 | 56 | — | — | — | — |

TABLE 7-continued

|  | Example 6 | Example 7 | Example 8 | Example 9 | Example 10 |
|---|---|---|---|---|---|
| Vinyl-based resin A7 | — | 40 | — | — | — |
| Vinyl-based resin A8 | — | — | 20 | — | — |
| Vinyl-based resin A9 | — | — | — | 20 | — |
| Urethane-based resin B1 | 60 | 60 | 80 | 80 | — |
| Urethane-based resin B3 | — | — | — | — | 30 |
| KBM903 | 5 | 0.5 | 3 | 0.1 | 0.1 |
| (A):(B) | 40:60 | 40:60 | 80:20 | 20:80 | 70:30 |

TABLE 8

|  | Example 11 | Example 12 |
|---|---|---|
| Resin composition(A10 + B1) | 100 | — |
| Resin composition(A11 + B2) | — | 100 |
| KBM603 | 1 | — |
| DBU | — | 1 |
| (A):(B) | 70:30 | 10:90 |

TABLE 9

|  | Example 13 | Example 14 |
|---|---|---|
| Resin composition (A11 + B2) | 100 | — |
| Vinyl-based resin A3 | — | 42 |
| Urethane-based resin B1 | — | 70 |
| TC750 | 4 | 4 |
| KBM403 | — | 1 |
| (A):(B) | 10:90 | 30:70 |

TABLE 10

|  | Comparative Example 1 | Comparative Example 2 |
|---|---|---|
| SAT-200 | 100 | — |
| ES-GX3440ST | — | 60 |
| Vinyl-based resin X | — | 40 |
| KBM903 | 1 | 1 |
| Dibutyltin laurate | — | 0.30 |

In Tables 6 to 10, the loadings of the respective blended substances are each represented in the unit of part by mass, details about the respective compounds are as described below, and the term "(A):(B)" represents a blending ratio between the vinyl-based resin (A) and the urethane-based resin (B) in the curable composition in terms of a mass ratio.

Vinyl-based resins A1 to A9: vinyl-based resins A1 to A9 synthesized in Synthesis Examples 1 to 9

Urethane-based resins B1 and B3: urethane-based resins B1 and B3 synthesized in Synthesis Examples 10 and 12

Resin composition (A10+B1): resin composition synthesized in Synthesis Example 13

Resin composition (A11+B2): resin composition synthesized in Synthesis Example 14

KBM903: aminomethyltrimethoxysilane, manufactured by Shin-Etsu Chemical Co., Ltd.

KBM603: N-aminoethyl-3-aminopropyltrimethoxysilane, manufactured by Shin-Etsu Chemical Co., Ltd.

DBU: 1,8-diazabicyclo[5.4.0]-7-undecene, manufactured by TOKYO CHEMICAL INDUSTRY CO., LTD.

TC-750: titanium diisopropoxybis(ethylacetoacetate), trade name: ORGATIX (registered trademark) TC-750, manufactured by Matsumoto Fine Chemical Co., Ltd.

Dibutyltin dilaurate (manufactured by TOKYO CHEMICAL INDUSTRY CO., LTD.)

SAT-200: crosslinkable silyl group-containing polyoxyalkylene-based polymer, crosslinkable silyl group: methyldimethoxysilyl group, manufactured by Kaneka Corporation ES-GX3440ST: crosslinkable silyl group-containing polyoxyalkylene-based polymer, crosslinkable silyl group: trimethoxysilyl group, manufactured by ASAHI GLASS CO., LTD.

TABLE 11

|  | Storage stability | Curability | Transparency |
|---|---|---|---|
| Example 1 | Nearly no thickening | ○ | ○ |
| Example 2 | Nearly no thickening | ○ | ○ |
| Example 3 | Nearly no thickening | ○ | ○ |
| Example 4 | Nearly no thickening | ○ | ○ |
| Example 5 | Nearly no thickening | ○ | ○ |
| Example 6 | Nearly no thickening | ○ | ○ |
| Example 7 | Nearly no thickening | ○ | ○ |
| Example 8 | Nearly no thickening | ○ | ○ |
| Example 9 | Nearly no thickening | ○ | ○ |
| Example 10 | Nearly no thickening | ○ | ○ |
| Example 11 | Nearly no thickening | ○ | ○ |
| Example 12 | Nearly no thickening | ○ | ○ |
| Example 13 | Nearly no thickening | ○ | ○ |
| Example 14 | Nearly no thickening | ○ | ○ |
| Comparative Example 1 | Nearly no thickening | x | ○ |
| Comparative Example 2 | Nearly no thickening | x | ○ |

TABLE 12

| Adhesiveness tests | | | | | | |
|---|---|---|---|---|---|---|
|  |  | Example 3 | Example 6 | Example 12 | Example 14 | Comparative Example 1 | Comparative Example 2 |
| Adhesiveness (N/mm$^2$) | Polycarbonate | 2.02 | 2.53 | 0.98 | 3.02 | — | 1.52 |
|  | Aluminum | 2.03 | 0.73 | 1.23 | 2.00 | — | 2.22 |

TABLE 12-continued

| | | Example 3 | Example 6 | Example 12 | Example 14 | Comparative Example 1 | Comparative Example 2 |
|---|---|---|---|---|---|---|---|
| Rise in adhesiveness (N/mm$^2$) | 5 minutes | 0.84 | 0.12 | 0.84 | 0.32 | 0.00 | 0.00 |
| | 10 minutes | 1.53 | 0.16 | 1.23 | 0.46 | 0.00 | 0.22 |
| | 30 minutes | 1.58 | 0.44 | 1.21 | 0.54 | 0.00 | 0.67 |

—: Unable to measure because the composition did not cure

The invention claimed is:

1. A curable composition, comprising:

(A) a vinyl-based resin obtained by causing a compound (I) represented by the following general formula (1) and a compound (II) represented by the following general formula (2) to react with each other;

(B) a urethane-based resin obtained by causing a hydroxyl group-containing organic polymer, a polyisocyanate compound, a compound (III) represented by the following general formula (3), and an amine compound to react with one another, said urethane-based resin having a terminal group represented by the following general formula (6); and (C) a curing catalyst:

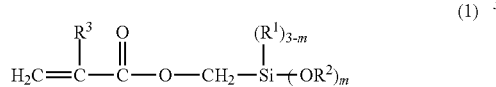
(1)

in the general formula (1), $R^1$ represents an alkyl group having 1 to 18 carbon atoms, an alkenyl group, an aryl group, or a phenyl group, $R^2$ represents an alkyl group having 1 to 4 carbon atoms, an alkenyl group, an aryl group, or a phenyl group, $R^3$ represents hydrogen or a methyl group, and m represents an integer of 1 to 3;

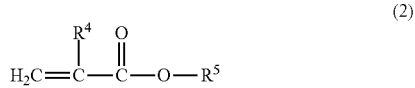
(2)

in the general formula (2), $R^4$ represents a hydrogen atom, a halogen atom, or an alkyl group having 1 to 3 carbon atoms, and $R^5$ represents a hydrogen atom, an alkali metal atom, or a hydrocarbon-containing group having 1 to 24 carbon atoms;

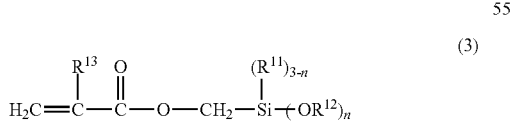
(3)

in the general formula (3), $R^{11}$ represents an alkyl group having 1 to 18 carbon atoms, an alkenyl group, an aryl group, or a phenyl group, $R^{12}$ represents an alkyl group having 1 to 4 carbon atoms, an alkenyl group, an aryl group, or a phenyl group, $R^{13}$ represents hydrogen or a methyl group, and n represents an integer of 1 to 3;

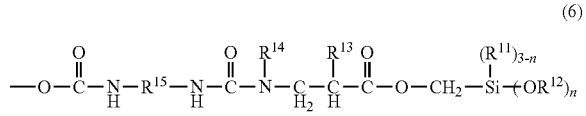
(6)

in the general formula (6), $R^{11}$ to $R^{13}$ and n are identical to $R^{11}$ to $R^{13}$ and n in the general formula (3) of the compound (III), respectively, $R^{14}$ represents a monovalent organic group derived from the amine compound used in the synthesis of the urethane-based resin (B), and $R^{15}$ represents a divalent organic group derived from the polyisocyanate compound used in the synthesis of the urethane-based resin (B).

2. A curable composition according to claim 1, wherein the curing catalyst (C) comprises an amine compound.

3. A curable composition according to claim 1, wherein the vinyl-based resin (A) comprises a structural unit represented by the following general formula (4) and a structural unit represented by the following general formula (5):

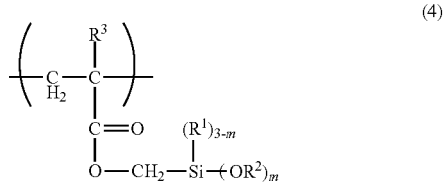
(4)

in the general formula (4), $R^1$ represents an alkyl group having 1 to 18 carbon atoms, an alkenyl group, an aryl group, or a phenyl group, $R^2$ represents an alkyl group having 1 to 4 carbon atoms, an alkenyl group, an aryl group, or a phenyl group, $R^3$ represents hydrogen or a methyl group, and m represents an integer of 1 to 3;

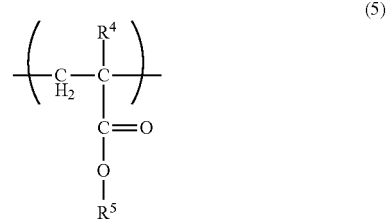
(5)

in the general formula (5), $R^4$ represents a hydrogen atom, a halogen atom, or an alkyl group having 1 to 3 carbon atoms, and $R^5$ represents a hydrogen atom, an alkali metal atom, or a hydrocarbon-containing group having 1 to 24 carbon atoms.

4. A curable composition according to claim 1, wherein the reaction for the vinyl-based resin (A) comprises free radical polymerization or living radical polymerization.

5. A curable composition according to claim 1, wherein two or more kinds of compounds in each of which $R^5$ in the general formula (2) represents an alkyl group having 1 to 24 carbon atoms are used as the compound (II).

6. A curable composition according to claim 5, wherein the compound (II) comprises a compound in which $R^5$ in the general formula (2) represents an alkyl group having 1 to 8 carbon atoms, and a compound in which $R^5$ in the general formula (2) represents an alkyl group having 10 to 24 carbon atoms.

7. A curable composition according to claim 5, wherein the compound (II) comprises a compound in which $R^5$ in the general formula (2) represents an alkyl group having 1 or 2 carbon atoms, and a compound in which $R^5$ in the general formula (2) represents an alkyl group having 7 to 9 carbon atoms.

8. A curable composition according to claim 1, wherein the hydroxyl group-containing organic polymer comprises a hydroxyl group-containing oxyalkylene-based polymer.

9. A curable composition according to claim 1, wherein the urethane-based resin is produced by a method comprising a step of causing:
   a prepolymer obtained by causing the hydroxyl group-containing organic polymer to react with the polyisocyanate compound; and
   a reaction product X obtained by causing the compound (III) to react with the amine compound, to react with each other.

10. A curable composition according to claim 1, wherein the urethane-based resin is produced by a method comprising the steps of:
   (a) causing a reaction product X obtained by causing the compound (III) and the amine compound to react with each other, and the polyisocyanate compound to react with each other to provide a reaction product Y; and
   (b) causing the reaction product Y obtained in the step (a) and the hydroxyl group-containing organic polymer to react with each other.

11. A curable composition according to claim 1, wherein the urethane-based resin (B) and the curing catalyst (C) are blended in amounts of 1 to 10,000 parts by mass and 0.000001 to 10 parts by mass, respectively with respect to 100 parts by mass of the vinyl-based resin (A).

12. A curable composition comprising:
   (A) a vinyl-based resin obtained by causing a compound (I) represented by the following general formula (1) and a compound (II) represented by the following general formula (2) to react with each other;
   (B) a urethane-based resin obtained by causing a hydroxyl group-containing organic polymer, a polyisocyanate compound, a compound (III) represented by the following general formula (3), and an amine compound to react with one another, said urethane-based resin having a terminal group represented by the following general formula (6); and
   (C) a curing catalyst:

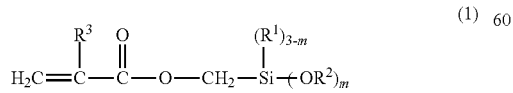

(1)

in the general formula (1), $R^1$ represents an alkyl group having 1 to 18 carbon atoms, an alkenyl group, an aryl group, or a phenyl group, $R^2$ represents an alkyl group having 1 to 4 carbon atoms, an alkenyl group, an aryl group, or a phenyl group, $R^3$ represents hydrogen or a methyl group, and m represents an integer of 1 to 3;

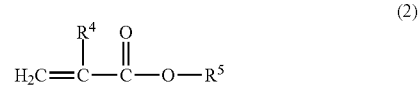

(2)

in the general formula (2), $R^4$ represents a hydrogen atom, a halogen atom, or an alkyl group having 1 to 3 carbon atoms, and $R^5$ represents a hydrogen atom, an alkali metal atom, or a hydrocarbon-containing group having 1 to 24 carbon atoms;

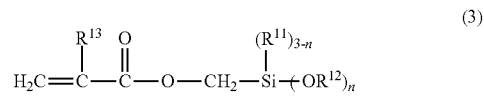

(3)

in the general formula (3), $R^{11}$ represents an alkyl group having 1 to 18 carbon atoms, an alkenyl group, an aryl group, or a phenyl group, $R^{12}$ represents an alkyl group having 1 to 4 carbon atoms, an alkenyl group, an aryl group, or a phenyl group, $R^{13}$ represents hydrogen or a methyl group, and n represents an integer of 1 to 3, wherein the curable composition is used in an adhesive;

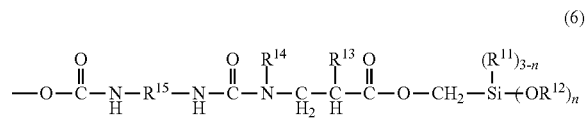

(6)

in the general formula (6), $R^{11}$ to $R^{13}$ and n are identical to $R^{11}$ to $R^{13}$ and n in the general formula (3) of the compound (III), respectively, $R^{14}$ represents a monovalent organic group derived from the amine compound used in the synthesis of the urethane-based resin (B), and $R^{15}$ represents a divalent organic group derived from the polyisocyanate compound used in the synthesis of the urethane-based resin (B).

13. An adhesive composition, comprising:
a curable composition comprising:
   (A) a vinyl-based resin obtained by causing a compound (I) represented by the following general formula (1) and a compound (II) represented by the following general formula (2) to react with each other;
   (B) a urethane-based resin obtained by causing a hydroxyl group-containing organic polymer, a polyisocyanate compound, a compound (III) represented by the following general formula (3), and an amine compound to react with one another, said urethane-based resin having a terminal group represented by the following general formula (6); and
   (C) a curing catalyst:

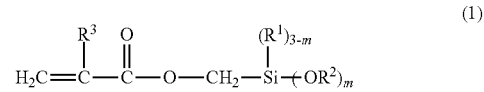

(1)

in the general formula (1), $R^1$ represents an alkyl group having 1 to 18 carbon atoms, an alkenyl group, an aryl group, or a phenyl group, $R^2$ represents an alkyl group having 1 to 4 carbon atoms, an alkenyl group, an aryl group, or a phenyl group, $R^3$ represents hydrogen or a methyl group, and m represents an integer of 1 to 3;

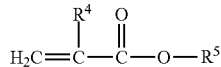
(2)

in the general formula (2), $R^4$ represents a hydrogen atom, a halogen atom, or an alkyl group having 1 to 3 carbon atoms, and $R^5$ represents a hydrogen atom, an alkali metal atom, or a hydrocarbon-containing group having 1 to 24 carbon atoms;

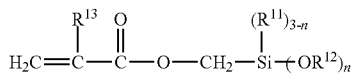
(3)

in the general formula (3), $R^{11}$ represents an alkyl group having 1 to 18 carbon atoms, an alkenyl group, an aryl group, or a phenyl group, $R^{12}$ represents an alkyl group having 1 to 4 carbon atoms, an alkenyl group, an aryl group, or a phenyl group, $R^{13}$ represents hydrogen or a methyl group, and n represents an integer of 1 to 3;

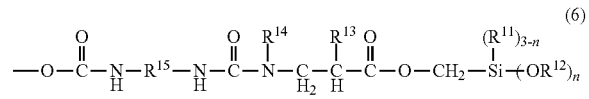
(6)

in the general formula (6), $R^{11}$ to $R^{13}$ and n are identical to $R^{11}$ to $R^{13}$ and n in the general formula (3) of the compound (III), respectively, $R^{14}$ represents a monovalent organic group derived from the amine compound used in the synthesis of the urethane-based resin (B), and $R^{15}$ represents a divalent organic group derived from the polyisocyanate compound used in the synthesis of the urethane-based resin (B).

\* \* \* \* \*